(12) United States Patent
Jungman et al.

(10) Patent No.: US 7,334,975 B2
(45) Date of Patent: Feb. 26, 2008

(54) FASTENER ASSEMBLY

(75) Inventors: Jeffrey Jungman, Detroit, MI (US); Gerard Jakuszeski, Oxford, MI (US); James Gerald Polubinski, Fraser, MI (US); David A. Harris, Fulton, IL (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

(21) Appl. No.: 10/430,794

(22) Filed: May 5, 2003

(65) Prior Publication Data

US 2004/0009052 A1 Jan. 15, 2004

Related U.S. Application Data

(63) Continuation-in-part of application No. 09/933,312, filed on Aug. 20, 2001, now Pat. No. 6,749,386.

(51) Int. Cl.
F16B 25/00 (2006.01)

(52) U.S. Cl. .................. 411/386; 411/311

(58) Field of Classification Search ........ 411/187, 411/188, 161, 308–311, 416, 486
See application file for complete search history.

(56) References Cited

U.S. PATENT DOCUMENTS

| 292,063 A | 1/1884 | Shailer |
|---|---|---|
| 367,196 A | 7/1887 | Debileux |
| 738,217 A | 9/1903 | Love |
| 752,628 A | 2/1904 | Miner |
| 827,562 A | 7/1906 | Pollock et al. |
| 889,593 A | 6/1908 | Fleischmann |
| 948,326 A | 2/1910 | Hesse |
| 1,015,059 A | 1/1912 | Morgan |
| 1,040,216 A | 10/1912 | Kriner |
| 1,088,892 A | 3/1914 | Foreman |
| 1,140,974 A | 5/1915 | Formby |
| 1,250,748 A | 12/1917 | Woodward |
| 1,297,845 A | 3/1919 | Hawrylasz |
| 1,300,801 A | 4/1919 | Woodward |
| 1,451,484 A | 4/1923 | Woodward |
| 1,622,581 A | 3/1927 | Gunkel |
| 1,697,118 A | 1/1929 | Hoke |
| 1,798,604 A | 3/1931 | Hoke |
| 1,807,494 A | 5/1931 | Proctor |
| 1,828,856 A | 10/1931 | Bridges |
| 1,862,486 A | 6/1932 | Trotter |
| 1,952,305 A | 3/1934 | Beck |
| 2,109,778 A | 3/1938 | Meersteiner |

(Continued)

FOREIGN PATENT DOCUMENTS

DE 298 15 492 U1 10/1998

(Continued)

*Primary Examiner*—Flemming Saether
(74) *Attorney, Agent, or Firm*—Dana Andrew Alden

(57) ABSTRACT

The present invention relates to a stud including, a head having a torque transferring structure and an underside wherein the underside includes a plurality of protrusions; a shaft having a trilobular shape comprising a plurality of shaft elements having at least one solid shaft element and a plurality of outer surfaces, wherein the plurality of outer surfaces includes a threaded surface with a locking thread located adjacent to a Vee-shaped thread.

25 Claims, 39 Drawing Sheets

U.S. PATENT DOCUMENTS

| | | | |
|---|---|---|---|
| 2,177,003 A | 10/1939 | Purtell | |
| 2,177,004 A | 10/1939 | Purtell | |
| 2,177,005 A | 10/1939 | Purtell | |
| 2,210,455 A | 8/1940 | Hosking | |
| 2,253,241 A | 8/1941 | MacDonald | |
| 2,266,758 A | 12/1941 | Holtz | |
| 2,269,476 A | 1/1942 | Poupitch | |
| 2,301,181 A | 11/1942 | Lisemann | |
| 2,352,540 A * | 6/1944 | Hanneman | 411/308 |
| 2,367,213 A | 1/1945 | Harding | |
| 2,371,365 A | 3/1945 | Tomalis | |
| 2,377,405 A | 6/1945 | Davies | |
| 2,382,019 A | 8/1945 | Miller | |
| 2,407,160 A | 9/1946 | Kohn | |
| 2,437,638 A | 3/1948 | Evans | |
| 2,562,032 A | 7/1951 | Gutensohn | |
| 2,637,361 A | 5/1953 | Nagel | |
| 2,679,744 A | 6/1954 | MacDonald | |
| 2,679,774 A | 6/1954 | MacDonald | |
| 2,735,470 A | 2/1956 | Poupitch | |
| 2,783,810 A | 3/1957 | Wrigley | |
| 2,788,046 A | 4/1957 | Rosan | |
| 2,856,617 A | 10/1958 | Widmann | |
| 2,873,641 A | 2/1959 | Evans | |
| 2,901,019 A | 8/1959 | Schweppe | |
| 3,076,208 A | 2/1963 | Moore | |
| 3,078,888 A | 2/1963 | MacLean, III et al. | |
| 3,124,188 A | 3/1964 | Muenchinger | |
| 3,182,703 A | 5/1965 | Smyth | |
| 3,196,918 A | 7/1965 | Hampton | |
| 3,213,742 A | 10/1965 | Kahn | |
| 3,247,877 A | 4/1966 | Evans | |
| 3,249,142 A | 5/1966 | Phipard | |
| 3,301,299 A | 1/1967 | Stanwick | |
| 3,339,389 A | 9/1967 | Moscow | |
| 3,342,234 A | 9/1967 | Evans | |
| 3,385,340 A * | 5/1968 | Evans | 411/310 |
| 3,391,721 A | 7/1968 | Rosan | |
| 3,417,802 A | 12/1968 | Oldenkott | |
| 3,426,820 A | 2/1969 | Phipard | |
| 3,454,070 A * | 7/1969 | Phipard, Jr. | 411/168 |
| 3,459,250 A | 8/1969 | Tabor | |
| 3,489,195 A | 1/1970 | Mortus | |
| 3,504,722 A | 4/1970 | Breed | |
| 3,517,717 A | 6/1970 | Orlomoski | |
| 3,520,343 A * | 7/1970 | Evans | 411/311 |
| 3,530,920 A | 9/1970 | Podell | |
| 3,633,455 A | 1/1972 | Larson | |
| 3,653,241 A | 4/1972 | Orlomoski | |
| 3,693,685 A | 9/1972 | Onufer | |
| 3,721,283 A | 3/1973 | Evans | |
| 3,794,092 A * | 2/1974 | Carlson et al. | 411/310 |
| 3,850,215 A | 11/1974 | Orlomoski | |
| 3,851,690 A | 12/1974 | Wing et al. | |
| 3,856,065 A | 12/1974 | Gehring | |
| 3,875,780 A | 4/1975 | Cochrum | |
| 3,877,339 A | 4/1975 | Muenchinger | |
| 3,878,759 A | 4/1975 | Carlson | |
| 3,901,066 A | 8/1975 | Orlomoski | |
| 3,907,017 A | 9/1975 | Stanwick | |
| 3,935,785 A | 2/1976 | Lathom | |
| 3,942,406 A | 3/1976 | Egner | |
| 3,942,570 A | 3/1976 | Bochman, Jr. et al. | |
| 3,978,760 A | 9/1976 | Muenchinger | |
| 3,982,575 A | 9/1976 | Ollis, Jr. et al. | |
| 4,040,327 A | 8/1977 | Otaki | |
| 4,071,067 A | 1/1978 | Goldby | |
| 4,076,064 A | 2/1978 | Holmes | |
| 4,150,702 A | 4/1979 | Holmes | |
| 4,171,012 A | 10/1979 | Holmes | |
| 4,252,168 A | 2/1981 | Capuano | |
| 4,258,607 A | 3/1981 | MaKwam | |
| 4,339,179 A | 7/1982 | Dany | |
| 4,341,497 A * | 7/1982 | Downey et al. | 411/311 |
| 4,351,626 A * | 9/1982 | Holmes | 411/311 |
| 4,377,361 A * | 3/1983 | Frieberg | 411/161 |
| 4,790,703 A | 12/1988 | Wing | |
| 4,812,095 A * | 3/1989 | Piacenti et al. | 411/168 |
| 4,820,098 A | 4/1989 | Taubert | |
| 4,867,625 A | 9/1989 | Dixon | |
| 4,941,787 A | 7/1990 | Shaffer | |
| 4,973,209 A * | 11/1990 | Essom et al. | 411/386 |
| 5,000,638 A | 3/1991 | Essom et al. | |
| 5,000,639 A * | 3/1991 | Hinkley et al. | 411/418 |
| 5,071,301 A | 12/1991 | Engelhardt et al. | |
| 5,141,374 A | 8/1992 | Olofsson | |
| 5,409,338 A * | 4/1995 | McKinlay | 411/149 |
| 5,746,560 A * | 5/1998 | Barth et al. | 411/188 |
| 5,984,602 A | 11/1999 | Park | |
| 5,997,231 A | 12/1999 | Goodwin | |
| 6,062,786 A * | 5/2000 | Garver et al. | 411/386 |
| 6,135,689 A * | 10/2000 | Matsunami | 411/311 |
| 6,155,761 A | 12/2000 | Donovan | |
| 6,296,432 B1 * | 10/2001 | Kato | 411/386 |
| 6,776,565 B2 | 8/2004 | Chang | |
| 6,796,761 B2 | 9/2004 | Mizuno | |
| 2002/0039522 A1 | 4/2002 | Hartman et al. | |

FOREIGN PATENT DOCUMENTS

DE    199 56 287 A1    5/2001

* cited by examiner

72

FASTENER ASSEMBLY

This is a continuation-in-part of application Ser. No. 09/933,312, filed on Aug. 20, 2001 now U.S. Pat. No. 6,749,386.

FIELD OF THE INVENTION

This invention relates to fasteners, and particularly to fasteners used to fasten cross members to the frames of trucks.

BACKGROUND OF THE INVENTION

Fastners are known in the art; however, back off and loosening have continued to be a problem in fastening applications. The present invention is directed to overcoming this and other disadvantages inherent in prior-art systems.

The present invention is directed to overcoming this and other disadvantages inherent in prior-art systems.

SUMMARY OF THE INVENTION

The scope of the present invention is defined solely by the appended claims, and is not affected to any degree by the statements within this summary. Briefly stated, a stud including, a head having a torque transferring structure and an underside wherein the underside includes a plurality of protrusions; a shaft having a trilobular shape comprising a plurality of shaft elements having at least one solid shaft element and a plurality of outer surfaces, wherein the plurality of outer surfaces includes a threaded surface with a locking thread located adjacent to a Vee-shaped thread.

DETAILED DESCRIPTION OF THE PRESENTLY PREFERRED EMBODIMENTS

Figure 1:
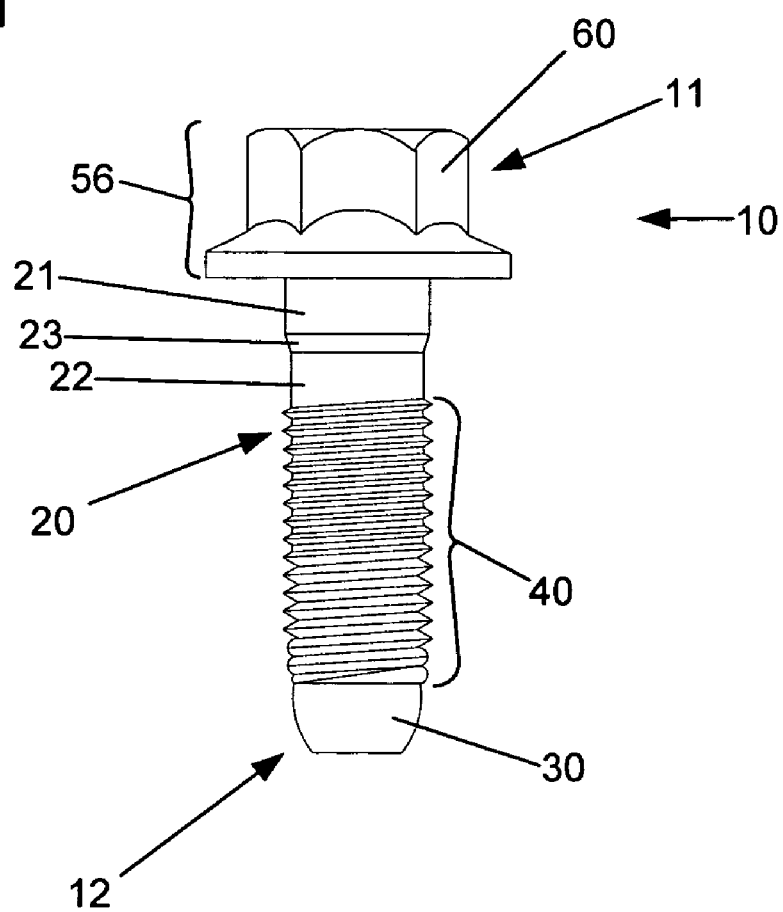
FIG. 1 depicts a side elevational view of the stud of the preferred embodiment.
Figure 2:
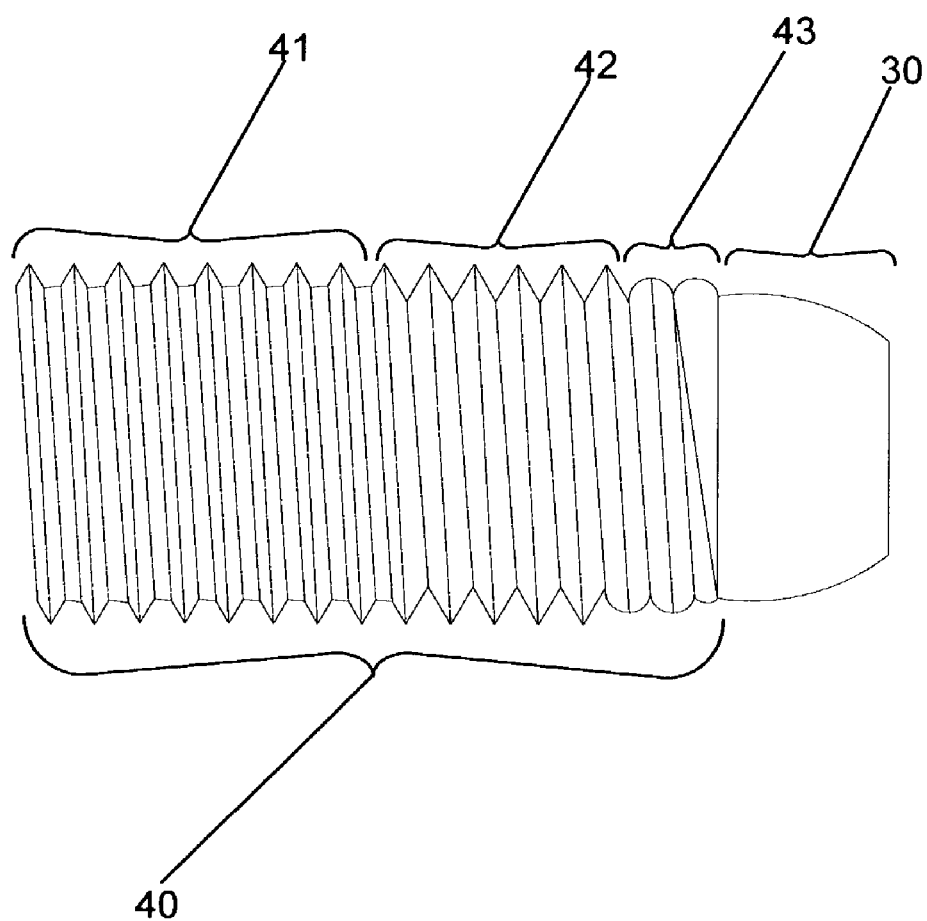
FIG. 2 depicts a close up view of a threaded surface on the stud of the preferred embodiment.
Figure 3:
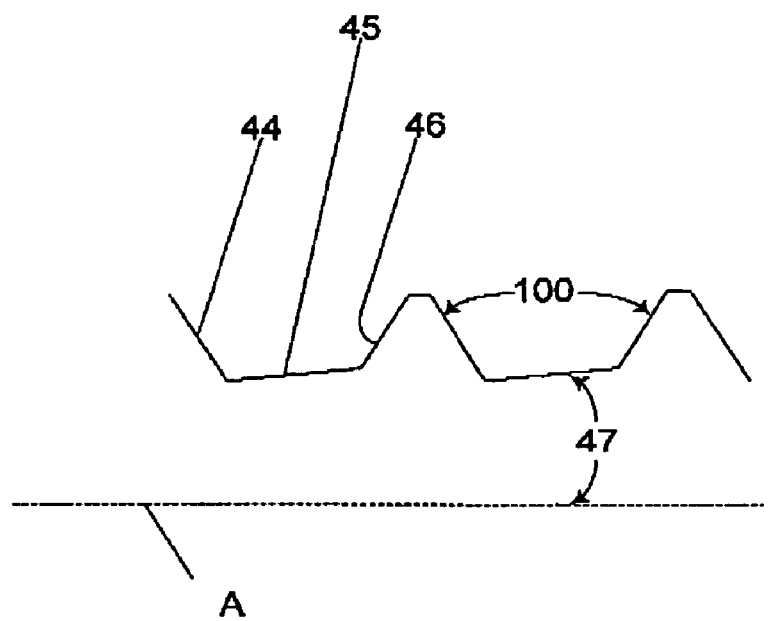
FIG. 3 depicts a close up view of a locking thread on the stud of the preferred embodiment.

Turning now to the drawings, FIGS. 1, 2, and 3 show a stud 10 constituting a preferred embodiment of the present invention. The stud 10 is composed of a metal, preferably aluminum. According to one aspect of the present invention, the metal is copper. According to another aspect of the present invention, the metal is iron.

In one aspect of the present invention, the metal is an alloy. According to another aspect of the present invention, the metal includes ferrous and non-ferrous materials. According to another aspect of the present invention, the metal is a steel. By way of example and not limitation, the steel is a stainless steel, such as 8286. In one embodiment of the present invention the steel is a low carbon steel, such as 1010. In another embodiment of the present invention, the steel is a medium carbon steel, such as 1038, 1541, or 4037. In yet another embodiment of the present invention, the steel is a high carbon steel, such as 8640 or 8650.

Those with skill in the art will also appreciate that the metal is a super alloy. According to one aspect of the present invention, the super alloy is bronze; according to another aspect of the present invention, the super alloy is a high nickel material. According to yet another aspect of the present invention, the stud 10 is composed of martensitic material, such as 410 or 416. According to still another aspect of the present invention, the stud 10 is composed of austenitic material, such as 302HQ, 304, or 305. According to another aspect of the present invention, the metal is a ferritic material.

FIG. 1 depicts the preferred embodiment of the present invention composed of a plurality of outer surfaces. As illustrated in FIG. 1, the shaft 20 provides a suitable location for at least one of a plurality of outer surfaces. A lower cylindrical shaft element 22 of the preferred embodiment includes a plurality of threads 40. Located adjacent to the threads 40 is an unthreaded surface 30.

The outer surfaces of the present invention perform a plurality of functions. In the preferred embodiment, the surface composed of a plurality of threads 40 functions to couple the stud 10 to another structure. This function is accomplished through the interaction of the plurality of threads 40 and the cooperating threads of a female threaded member, such as a nut body 52.

The stud 10 includes a first end 11, a second end 12, a shaft 20 and, preferably, a head 56. The shaft 20 is composed of at least one of a plurality of shaft elements. According to one aspect of the present invention, the shaft element is cylindrical in shape. According to another aspect of the present invention, the shaft element is conical in shape. According to yet another aspect of the present invention, the shaft element is solid. According to still yet another aspect of the present invention, the shaft element is hollow.

FIG. 1 depicts the preferred embodiment of the present invention composed of a plurality of shaft elements. The shaft 20 includes an upper cylindrical shaft element 21, a lower cylindrical shaft element 22, and a conical shaft element 23. In the preferred embodiment, the upper cylindrical shaft element 21 is joined to the lower cylindrical shaft element 22 via the conical shaft element 23.

Figure 11:
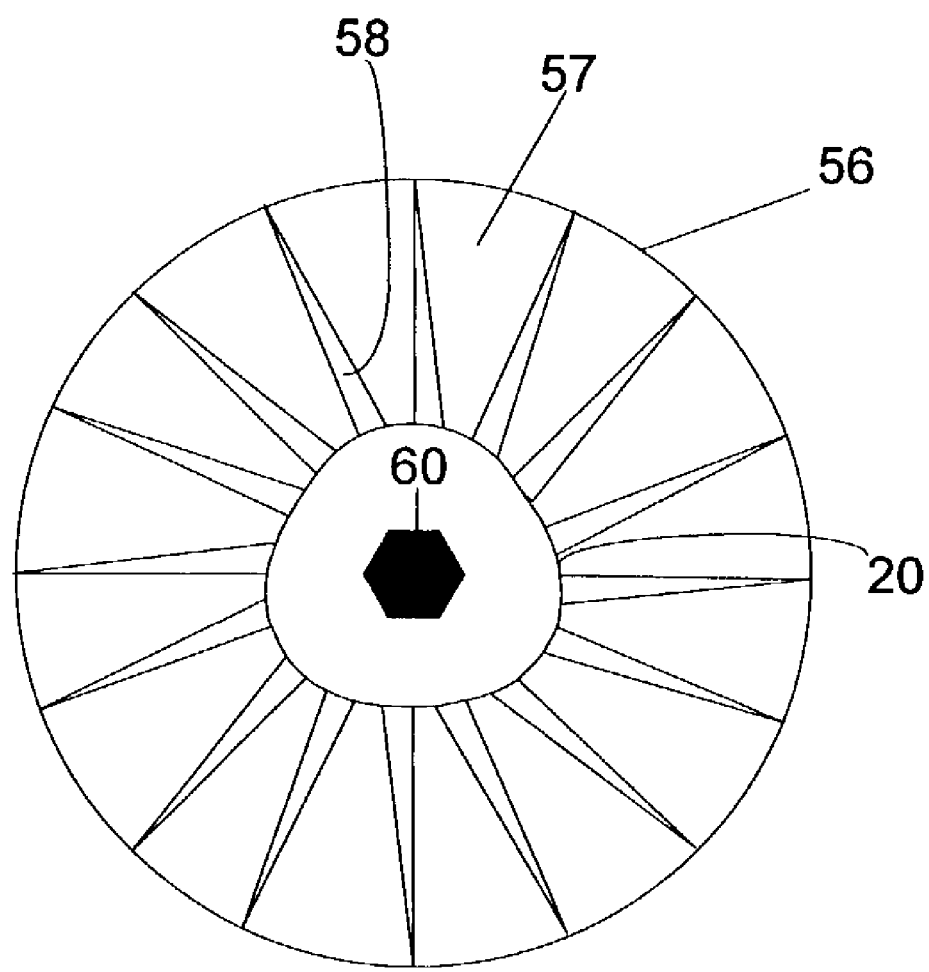
FIG. 11 depicts a bottom plain view of the stud of the presently preferred embodiment.

The presently preferred embodiment includes at least one torque transferring structure 60. As used herein, a torque transferring structure 60 is any structure which allows a torque to be transferred to the present invention. The torque transferring structure 60 of the preferred embodiment cooperates with the surface with threads 40 to tighten or loosen the connection between the present invention and another structure. In the embodiment depicted in FIG. 1, the torque transferring structure 60 is located on the head 56 preferably in a polygonal shape such as a hexagon. Alternatively, as shown in FIG. 11, the torque transferring structure 60 is located on the shaft as an internal drive 61 configured to cooperate with a tool, such as a wrench or a screw driver. In the preferred embodiment of the present invention, a torque transferring structure 60 is located on the head 56 and on the bottom of the shaft 20.

Those skilled in the art will appreciate that torque is transferred via a plurality of structures and that any such structure can be used without departing from the spirit of the present invention. Any structure which allows a torque to be transferred to the present invention is a torque transferring structure within the scope of the present invention.

The stud 10 of the present invention is provided with a plurality of outer surfaces. According to one aspect of the present invention, the outer surface is an unthreaded surface 30. According to another aspect of the present invention, the outer surface is a threaded surface 40.

FIG. 2 depicts the threaded surface 40 in greater detail. As shown therein, the threaded surface 40 is provided with a plurality of thread configurations 41, 42, 43. The threaded surface 40 is provided with a locking thread 41. FIG. 3 depicts a cross-sectional view of a plurality of locking threads 41 in greater detail. As depicted in FIG. 3, the locking thread 41 is provided with a plurality of angled surfaces 44, 46. In the preferred embodiment, the locking thread 41 is provided with a first angled surface 44 and a second angled surface 46. Advantageously, the first angled surface 44 is at an angle 100 with respect to the second angled surface 46 ranging between 30 to 70°, preferably 60°.

Located between the first angled surface 44 and the second angled surface 46 is a root surface 45. The root surface 45 of the locking thread 41 includes a root diameter. The root surface 45 is at an angle 47 with respect to an imaginary horizontal line A running along the axis of the shaft 20. Preferably, the angle 47 is between 4° and 8°. The root surface 45 has a width that is greater than that found in a conventional thread and is configured so that the locking thread 41 converges to the head 56.

Figure 4:
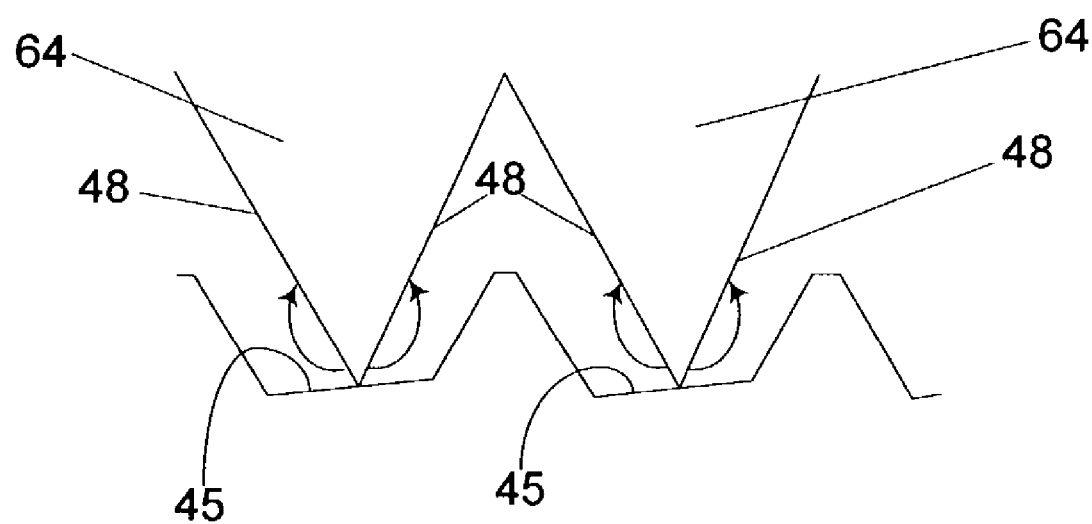
FIG. 4 depicts a close up view of the locking threads cooperating with the threads of a nut body.

The locking thread 41 is configured to cooperate with the threads 64 of a nut body 52, also referred to herein as a female threaded member. As the nut body 52 is torqued onto the shaft 20, the root surfaces 45 within the locking threads 41 exert a force on the threads 64 of the nut body 52. As depicted in FIG. 4, in cases where the threads 64 of the nut body 52 include a metal, the root surface 45 exerts a force upon the thread 64 of the nut body 52 so that the metal flows upward on a flank 48 of the thread 64.

Figure 5:
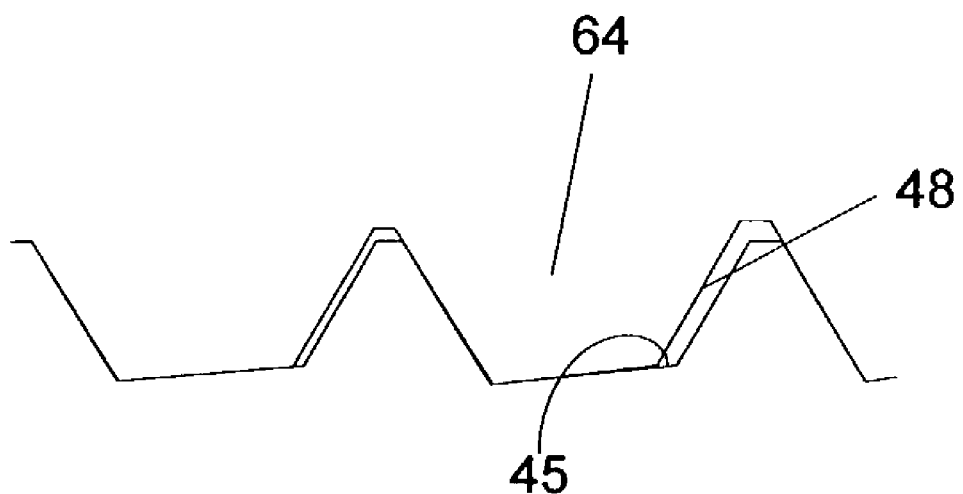
FIG. 5 depicts a close up view of the locking threads cooperating with the threads of a nut body.

Referring now to FIG. 5, the threads 64 of the nut body 52 are re-formed so that the threads 64 generally conform to the configuration of the locking thread 41. As depicted in FIG. 5, the flank 48 of the thread 64 of the nut body 52 is re-formed so that it is in contact with at least one of the angled surfaces 44, 46 of the locking thread 41. FIG. 5 further depicts the threads 64 of the nut body 52 re-formed so that a greater surface area is in contact with the root surfaces 45 on the shaft 20.

Figure 6:
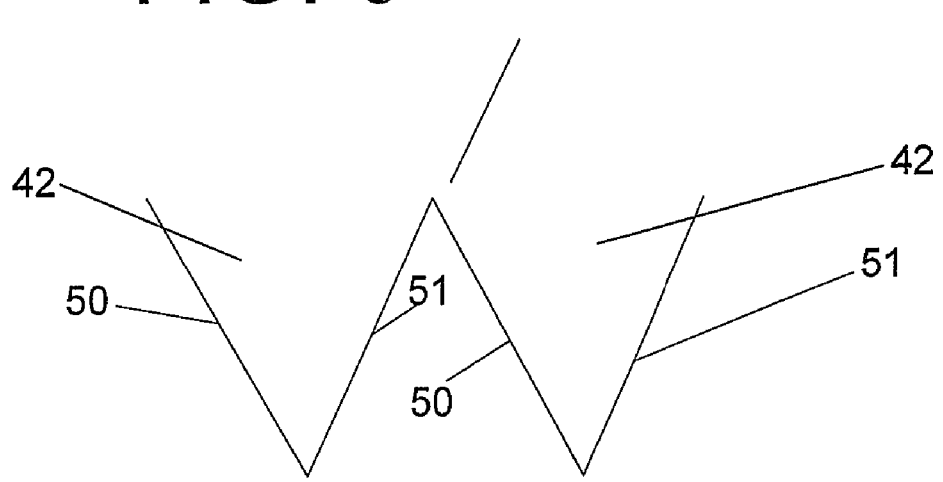
FIG. 6 depicts a close up view of the Vee-shaped threads on the stud of the preferred embodiment.

As depicted in FIG. 2, a plurality of Vee-shaped threads 44, also referred herein as conventional threads, are located adjacent to the plurality of locking threads 41 and provided with a thread root 129. The Vee-shaped threads 44 include a root diameter and a crest diameter. As depicted in FIG. 2, the root diameter of the locking thread 41 is greater than the root diameter of the Vee-shaped threads 44. A cross-sectional view of a plurality of Vee-shaped threads 42 is depicted in greater detail in FIG. 6. As shown therein, a Vee-shaped thread 42 is provided with a first side 50 and a second side 51. The sides 50, 51 abut one another and are configured to form a Vee shape. The first side 50 is at an angle with respect to the second side 51, preferably ranging between 30° and 90°.

Figure 7:
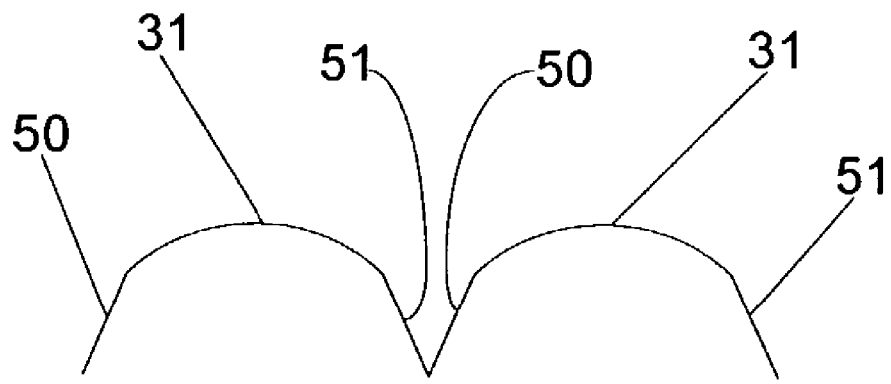
FIG. 7 depicts a close up view of the curved threads on the stud of the preferred embodiment.

FIG. 2 further depicts a plurality of curved threads 43 located adjacent to the Vee-shaped threads 42. In this application, the term curved threads 43 is also referred to herein as guide threads. FIG. 7 depicts a cross-sectional view of a plurality of curved threads 43 in greater detail. According to one aspect of the present invention, the curved threads 43 are configured to prevent cross-threading. According to another aspect of the present invention, the curved threads 43 are configured to orient the threads 64 of a nut body 52 so that the threads 64 align with the threaded surface 40 on the shaft 20.

Figure 8:
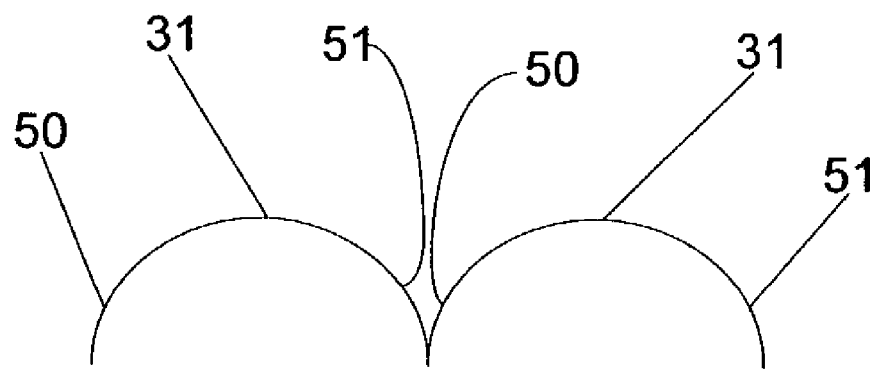
FIG. 8 depicts a close up view of the curved threads on the stud of an alternative embodiment.

As shown in FIG. 7, the curved threads 43 are provided with at least one curved surface 31. In the preferred embodiment, the curved threads 43 are provided with a first side 50 and a second side 51. The curved surface 31 is located between the first side 50 and the second side 51. As shown in FIG. 7, the first side 50 is at angle with respect to the second side 51, preferably ranging between 30° and 90°. Alternatively, as shown in FIG. 8, the first and second sides 50, 51 are curved.

Figure 9:
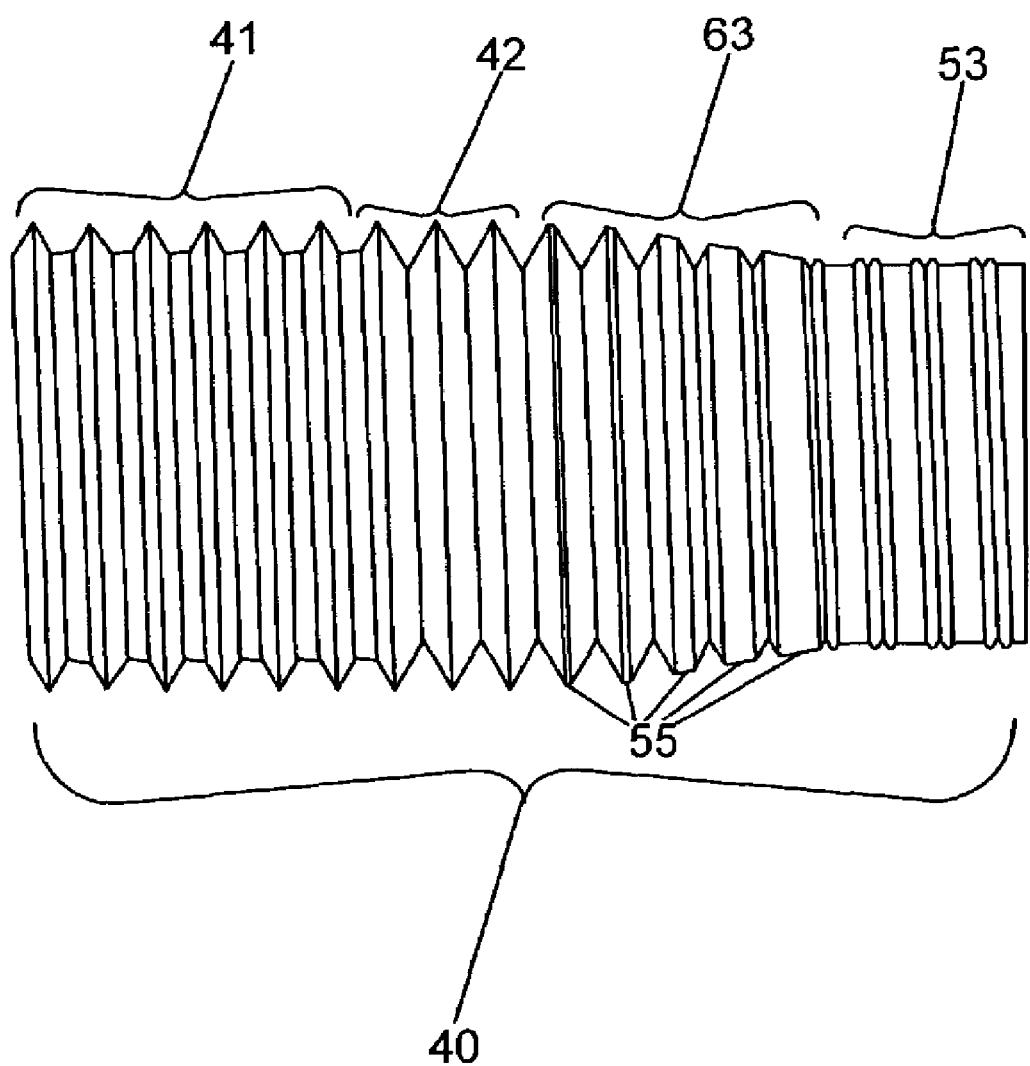
FIG. 9 depicts a close up view of the threaded surface on the stud of an alternative embodiment.

FIG. 9 depicts a cross-sectional view of an alternative threaded surface 40. As shown therein, the threaded surface 40 includes a plurality of guide threads 53. The guide threads 53 include a crest diameter. As illustrated in FIG. 2 and FIG.9. the guide threads 43, 53, 63, differ from the conventional threads on the shaft 20 in that the conventional threads are provided with a crest diameter (referred to herein as a "first crest diameter") that is, at least in part, greater than a crest diameter of the guide threads (referred to herein as a "second crest diameter"). According to one aspect of the present invention, the guide threads 53 are configured to prevent cross-threading. According to another aspect, the guide threads 53 are configured to orient the threads 64 of a nut body 52 that the threads 64 align with the threaded surface 40 on the shaft 20. As shown in FIG. 9, the guide threads 53 are located at an end of the shaft 20 and are provided with a reduced diameter relative to the Vee-shaped threads 42. In this application, the term "guide means" refers to threads on a shaft 20 that have a crest diameter that is, at least in part, less than the crest diameter of the conventional thread on the shaft 20. Guide means encompasses structures on a shaft 20 that generally align the threads of the shaft 20 with those of a female threaded member.

A plurality of plateau threads 63 are located adjacent to the guide threads 53. In this application, the term plateau threads 63 is also referred to herein as guide threads. As depicted in FIG. 9, the plateau threads 63 are provided with a plurality of plateaus 55. The plateaus 55 are shaped to prevent cross-threading and to orient the nut body so that the threads 64 align with the threaded surface 40 on the shaft 20. In the embodiment depicted in FIG. 9, the plateaus 55 are conically or frusto-conically shaped, preferably to provide a ramped cross-sectional profile.

Referring now to FIG. 11, a bottom cross-sectional view of the shaft 20 is shown. The shaft 20 is advantageously provided with a trilobular shape; however a circular or ovular shape could be used. As further depicted in FIG. 11, at an end of the shaft 20, there is provided a torque transferring structure 60 in the form of an internal drive, preferably hexagonal in shape.

Figure 10:
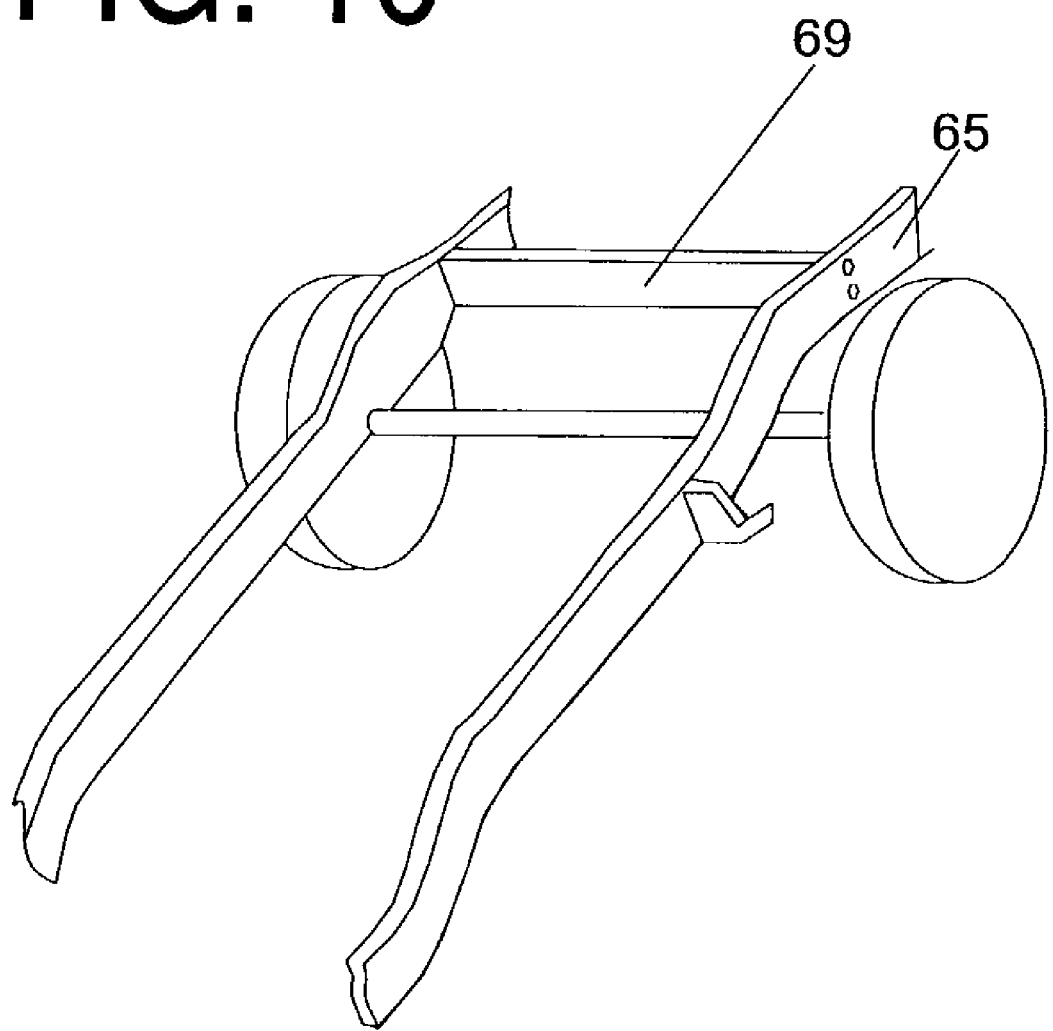
FIG. 10 depicts the stud of the presently preferred embodiment used to fasten a cross member to the frame of a truck.
Figure 13:
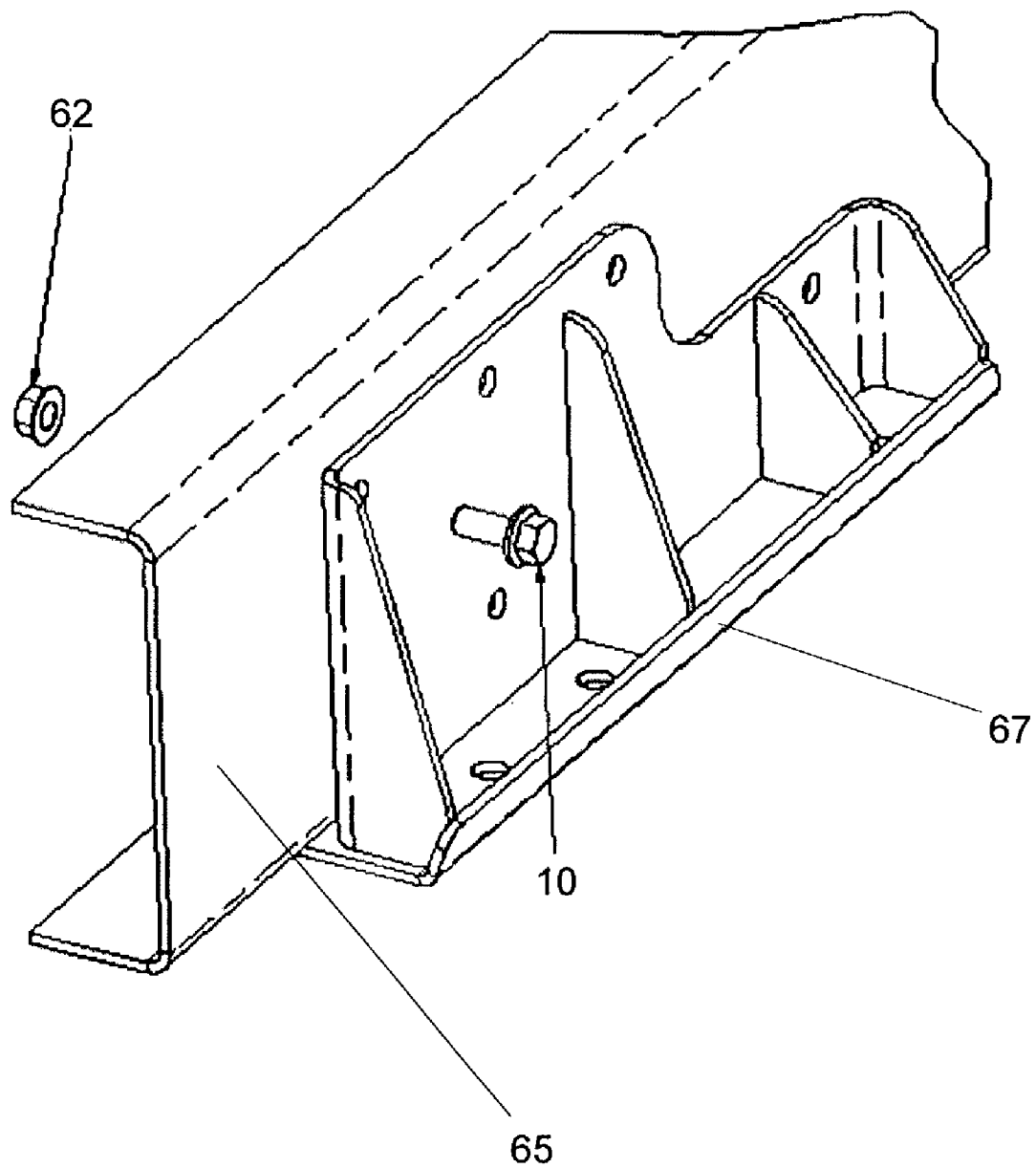
FIG. 13 depicts the stud of the presently preferred embodiment while fastening a structure to a frame.

FIG. 11 further depicts the underside 57 of the head 56. As shown in FIG. 11, the underside 57 of the head 56 is provided with a plurality of protrusions 58. The protrusions 57 depicted in FIG. 11 are shaped to prevent rotation of the stud 10 when the stud 10 is fastened. FIG. 13, for example, depicts a structure 67 being fastened to the frame 65 of a truck. By way of further example, as shown in FIG. 10, the stud 10 is advantageously used to fasten a cross member 69 to the frame 65 of a truck.

Figure 12:
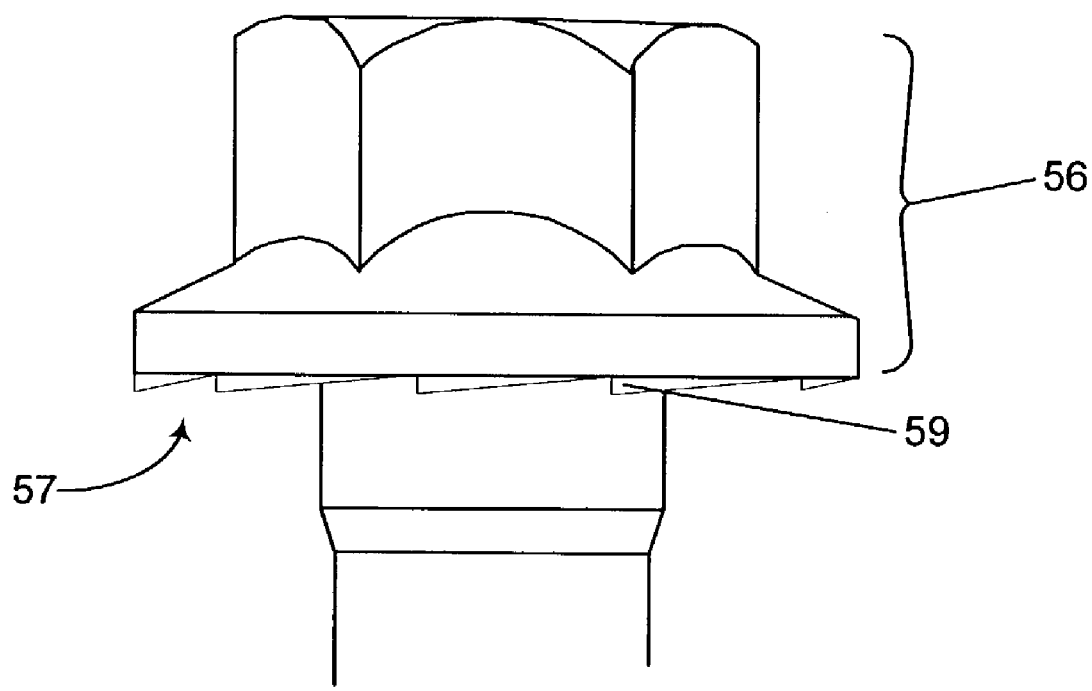
FIG. 12 depicts a side elevational view of the stud of the presently preferred embodiment.

Referring now to FIG. 12, the protrusions 58 provide the underside 57 of the head 56 with a roughened surface 59. The roughened surface 59 increases the frictional coefficient between the underside 57 of the head 56 and another surface, such as the surface of a frame 65 of a truck. In the preferred embodiment, the protrusions 58 on the underside 57 of the head 56 are angled, preferably between 2° and 90°.

The stud 10 is fabricated through a plurality of processes. According to one aspect of the present invention, the stud 10 is machined. According to another aspect of the present invention, the stud 10 is hot formed or forged. According to yet another aspect of the present invention, the stud 10 is fabricated through casting. The preferred embodiment of the present invention is cold formed (also known as "cold head").

The process of cold forming the stud begins with a metal wire or metal rod which is drawn to size. After being drawn to size, the wire or rod is upset by being run through a series of dies or extrusions. First, the head 56 is formed, preferably with the protrusions 58. Then, the shaft 20 is extruded to have a trilobular cross section. Then the threads 40 are rolled with a sectional die. Preferably, the curved threads 43 are rolled first. Then, the Vee-shaped threads 42 are rolled. Finally, the locking threads 41 are rolled.

In the case of a carbon steel being used as a material in the stud 10, it is desirable to heat treat the stud 10 through a quench and temper. In the case of a stainless steel being used, such as A8286, it is desirable to put the stud 10 through a solution anneal and then age hardening in a furnace via ASTM A453.

To finish the stud 10, it is coated with a low friction coating via a dip and spin. However, a plating, an organic coating, PTFE, a dacromet coating, an inorganic coating, dorraltone, a zinc coating, such as an electro zinc coating, a coating containing phosphate and oil, a ceramic coating, or a coating of waxes and oils may all be used.

Figure 16:
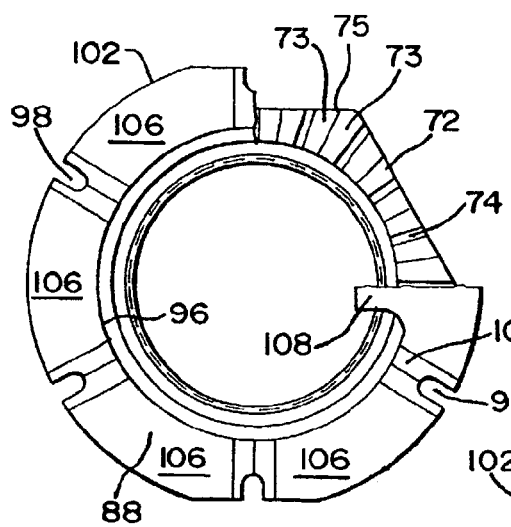
FIG. 16 is a bottom plain view, partially in section, of a nut-washer of an alternative embodiment.

The stud 10 is configured to operate with a nut 52 or a nut-washer assembly 99. Referring now to FIG. 16, the presently preferred embodiment of the nut-washer 99 is depicted. As depicted therein, the nut-washer 99 is provided with a nut 52. The nut 52 is preferably fabricated from steel, preferably a carbon steel, such as 1020 to 1045 steel.

The nut body 52 is preferably forged. The steel is first heated to 2100° F., cut into segments, and pressed so that it is circular and larger in diameter. Then a portion of the inner surface and a torque transmitting surface 66 are forged. Thereafter, another portion of the inner surface is punched out and the nut 52 is then heat treated to an average hardness ranging between 26 and 36 on the Rockwell C scale, preferably 31.

The washer body 82 is preferably fabricated from an alloy grade steel, such as 4140 steel. However, those skilled in the art will appreciate that a medium carbon steel such as 1020 to 1045 steel may be used. Similar to the nut body 52, it is preferred that the washer body 82 be fabricated through forging. The steel is first heated to 2100° F., cut into segments, and pressed so that it is circular and larger in diameter. Then, an annulus is formed and punched out. The washer body 82 is heat treated to an average hardness ranging between 28 and 42 on the Rockwell C scale, preferably 36.

The nut 52 and washer 54 are assembled together. The nut 52 is mated with the washer 54 and then a collar on the nut is flared out. Those skilled in the art will appreciate that the flare provides a lead for the threads. Then, a tap is sent down through the nut body 52, and threads are cut into the nut body 52. The threads preferably have a diameter m the range of M8 up to an M30.

The nut body 52 and/or the washer body 82 may advantageously be provided with a coating. Preferably, the coating is of a formulation that prevents rust and/or corrosion; however, other coatings may be used. By way of example, and not limitation, the coating may be a formulation that reduces friction. In one embodiment, the coating reduces friction between the nut and the washer. In another embodiment, the coating reduces friction within the threads.

Those skilled in the art will appreciate that various chemical compounds may be used as suitable coatings. In one embodiment, polytetrafluoroethylene or PTFE is used. In another embodiment, a zinc coating is used. In yet another embodiment, a water-based coating dispersion containing metal oxides and/or aluminum flakes is used.

Figure 14:
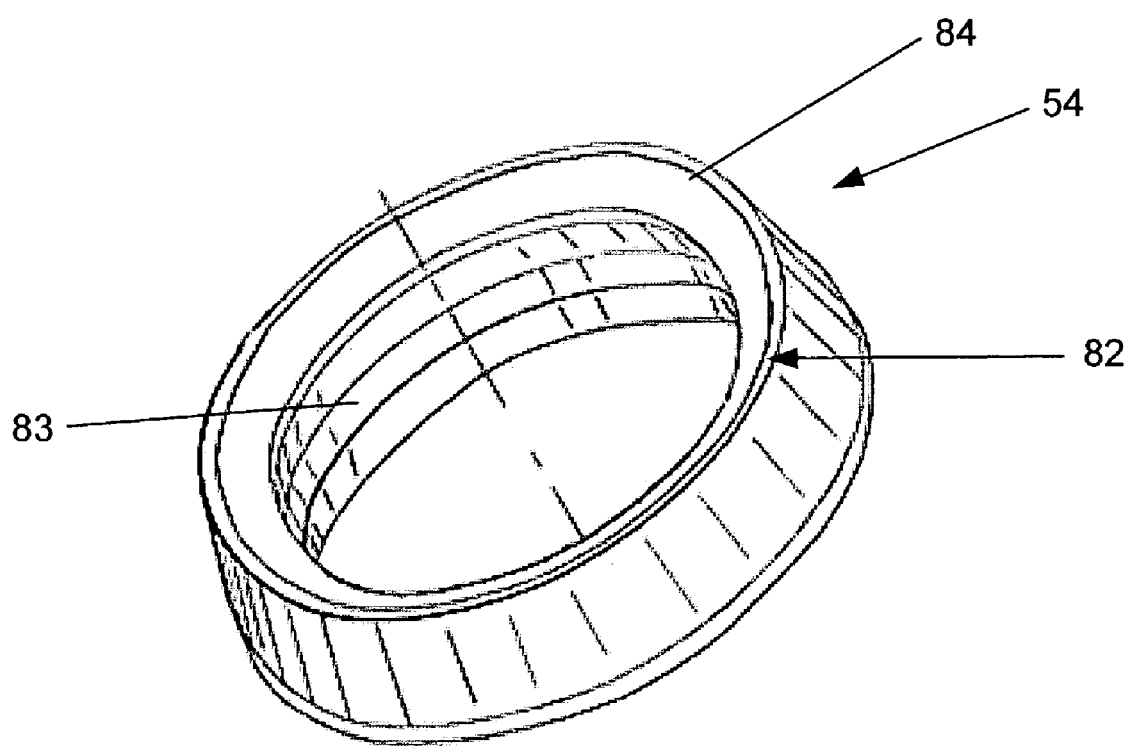
FIG. 14 is an exploded perspective view of a washer of the preferred embodiment
Figure 15:
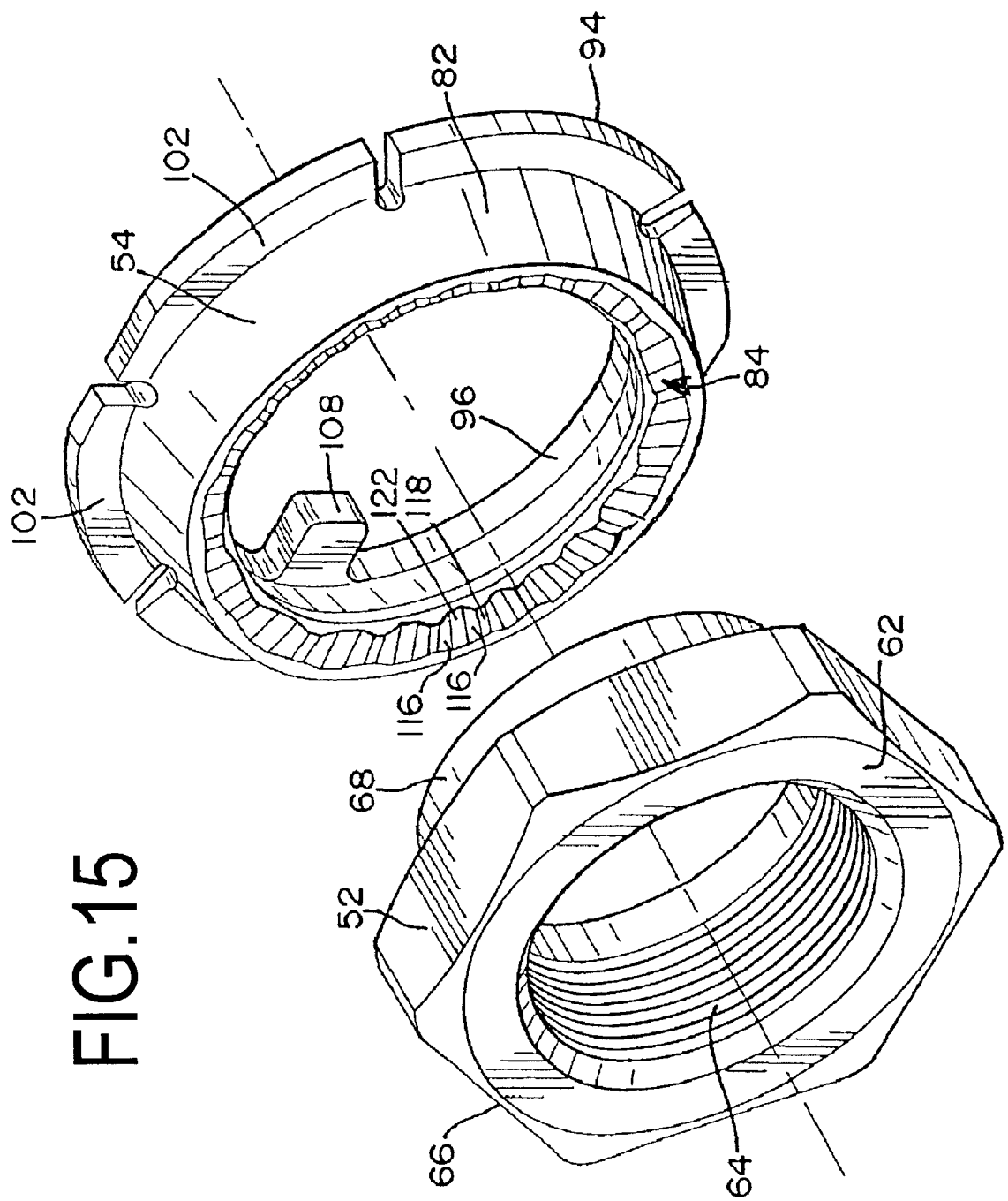
FIG. 15 is an exploded perspective view a washer of an alternative embodiment.

In the preferred embodiment the nut 52 is a body that is internally threaded at 64, as shown in FIG. 14. The internal threads at 64 preferably extend to an internal portion of a skirt 68.

The nut body 52 is provided with a plurality of curved and flat surfaces. As shown in FIG. 14 externally around the periphery of the nut body 52 is a torque transmitting surface 66. The torque transmitting surface 66 of the preferred embodiment comprises a plurality of surfaces. As depicted in FIG. 14, the plurality of surfaces are arranged in the preferred hexagonal shape.

The nut body 52 is provided with an annular surface 72. The annular surface 72 is located at the bottom of the nut body 52, above a skirt 68. Referring now to FIG. 11, the annular surface 72 is preferably generally frusto-conical in shape. However, those skilled in the art will appreciate that the annular surface 72 can be spherically concave, spherically convex, or flat, without departing from the scope of the invention. By way of example and not limitation, the annular surface 72 can be flat where the application does not require a washer 54.

The annular surface 72 can be fabricated using any desired technique. In the preferred embodiment, the annular surface 72 is preferably fabricated by cold forging. The cold forging is preferably accomplished through the use of a die insert. The die insert is preferably machined to the desired shape using conventional ball end mill techniques.

Figure 28:
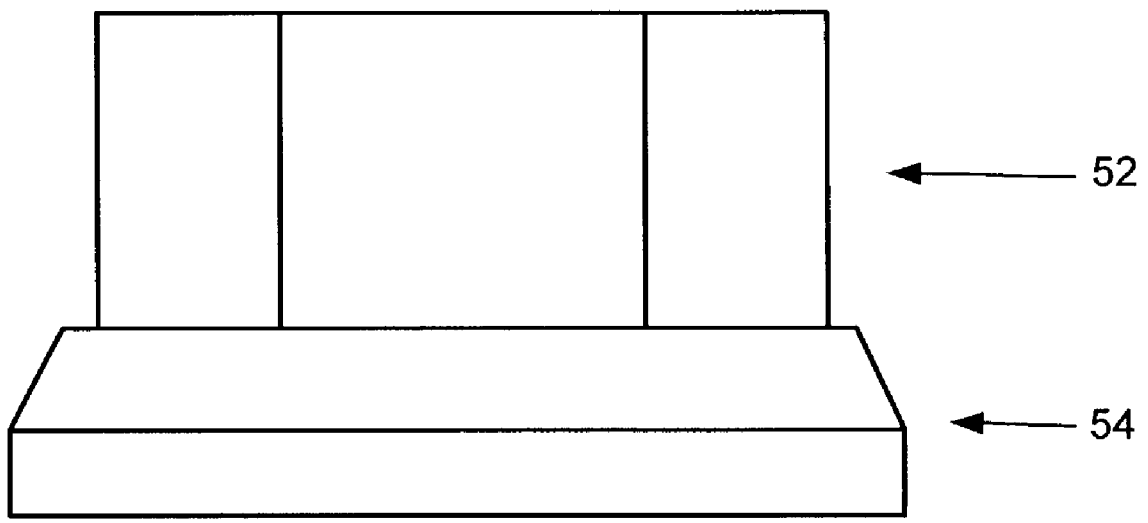
FIG. 28 is side elevational view of a nut-washer of the preferred embodiment.

In an alternative embodiment the annular surface 72 is undulating in shape. The annular surface 72 of this embodiment is configured to cooperate with a bearing surface 84. As depicted in FIG. 28, the annular surface 74 is undulating in shape. The annular surface 72 therein is provided with an annularly extending series of surfaces, which provide a uniform undulation around the entire annular surface 72.

Figure 18:
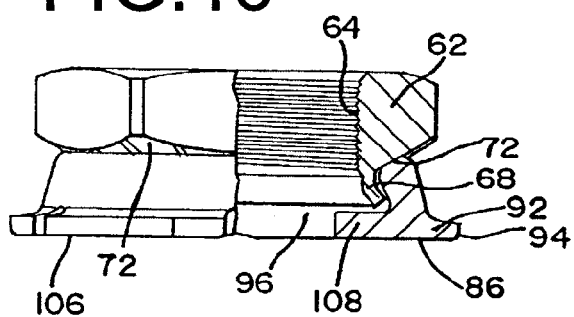
FIG. 18 is a side elevational view, partially in section, of a nut and washer of an alternative embodiment.

FIG. 18 depicts yet another alternative embodiment of the present invention. As depicted therein, the annular surface 72 is provided with a plurality of lower peaks. The lower peaks are provided as plateau segments 74.

The plateau segments 74 are preferably generally spherically convex. The plateau segments 74 are provided with the same radius as the valleys 122 on the bearing surface 84. The plateau segments 74 are formed in the cold forging process so that they are all convex and lie on the surface of an imaginary sphere whose center is on the axis of the nut body 52. The radius of that sphere ranges from 0.1 inches to 2.00 inches.

The plateau segments 74 are adjacent to a plurality of faces 73. Each plateau segment 74 is adjacent to a pair of faces 73 that are oppositely inclined. The annular surface 72 of this alternative embodiment is provided with an annularly extending series of faces 73, which form a uniform undulation around the entire surface. The faces 73 are configured to be complementary with corresponding bearing faces 116 on the bearing surface 84. The faces 73 are provided with the same radius as the bearing faces 73 on the bearing surface 84.

As depicted in FIG. 18, the faces 73 are preferably generally spherically convex. Each face 73 is formed so that it is convex and is curved both radially and circumferentially with respect to the nut body 52.

Each face 73 is adjacent to a valley 75. Each valley 75 is adjacent to a pair of faces 73. The valleys 75 are configured to be narrower than valleys 122 on the bearing surface 84. As depicted in FIG. 18, the valleys 75 are preferably generally spherically convex.

The valley 75 and adjacent faces 73 of the alternative embodiment provide a generally inverted Vee-shape profile. The Vee-shaped profile provides the plateau segments 74 with a height. The height equals the vertical distance between the plateau segment 74 and the valley 75. The height is preferably slightly greater than the clearance between the threads at 64 and those on a stud 10, when the nut-washer 99 is in place. In this alternative embodiment, the height ranges between 0 inches and 0.030 inches (0.038 mm).

The nut 52 is preferably provided with a skirt 68. The skirt extends axially away from the nut body 52 at the inner end of internal threads 64. The skirt 68 is configured to cooperate with a washer 54. The skirt 68 is shaped to retain a washer 54 in a loose relationship. In the preferred embodiment, the skirt 68 is adapted to extend axially from the annular surface 72 into the generally cylindrical washer body 82 whereupon it is formed outwardly under an undercut shoulder within the washer body 82 to loosely but securely hold the washer 54 and nut 52 together.

Figure 17:
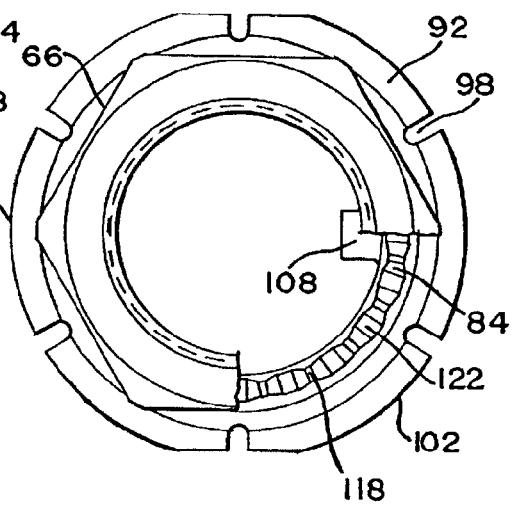
FIG. 17 is a top plain view, partially in section, of a nut-washer of an alternative embodiment.

As shown in FIG. 11, depending from the nut body 52 is a unitarily formed annular skirt 68. As shown in FIG. 17, the skirt 68 is provided with a flared portion 85 that functions to retain the washer 54. Those skilled in the art will appreciate that, for an application that does not require a washer 54, the nut 52 can be fabricated without the skirt 68 without departing from the scope of the present invention.

Referring now to FIG. 16, the presently preferred embodiment of the nut-washer 99 is depicted. As depicted therein the nut-washer 99 is provided with a washer 54. The washer 54 is preferably fabricated from steel. The steel is preferably medium carbon steel. The steel is preferably forged and then heat treated to an average hardness of 33 on the Rockwell C scale As shown in FIG. 13, the washer 52 is provided with a washer body 82. In the preferred embodiment, the washer body 82 is generally annular in shape. As shown in FIG. 13, a portion of the washer body 82 is generally cylindrical.

The washer body 82 is provided with a bearing surface 84. The bearing surface 84 can be fabricated using any desired technique. The bearing surface 84 is preferably fabricated by cold forging. The cold forging is preferably accomplished through the use of a die insert. The die insert is preferably machined to the desired shape using conventional ball end mill techniques.

As depicted in FIG. 13, the bearing surface 84 is preferably located on the inner end of the washer body 82. As depicted therein, the bearing surface 84 is preferably generally frusto-conical in shape. However, those skilled in the art will appreciate that the bearing surface 84 can be spherically concave, spherically convex, or flat, without depart from the scope of the invention.

Figure 19:
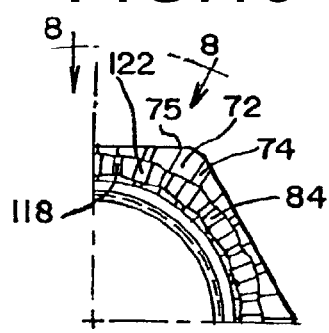
FIG. 19 is a plain view of a quarter segment of overlying annular and bearing surfaces of a nut and washer, respectively, of an alternative embodiment, showing theft relationship to each other circumferentially.
Figure 20:
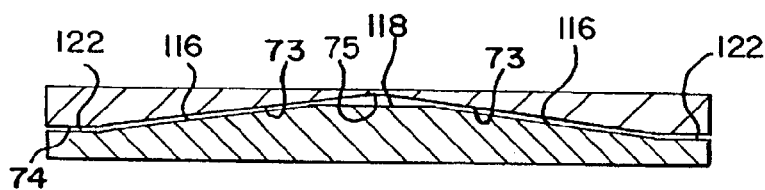
FIG. 20 is an enlarged sectional view of an arcuate portion (on an 180 arc in the present illustration) of the faces and bearing faces mating in the assembly of an alternative embodiment, the view depicting curved surfaces as straight because of this.

In an alternative embodiment the bearing surface 84 is undulating in shape. The bearing surface 84 of this embodiment is configured to cooperate with an annular surface 72. As depicted in FIG. 19, the bearing surface 84 is undulating in shape. The bearing surface 84 therein is provided with an annularly extending series of surfaces, which provide a uniform undulation around the entire bearing surface 84.

Figure 26:
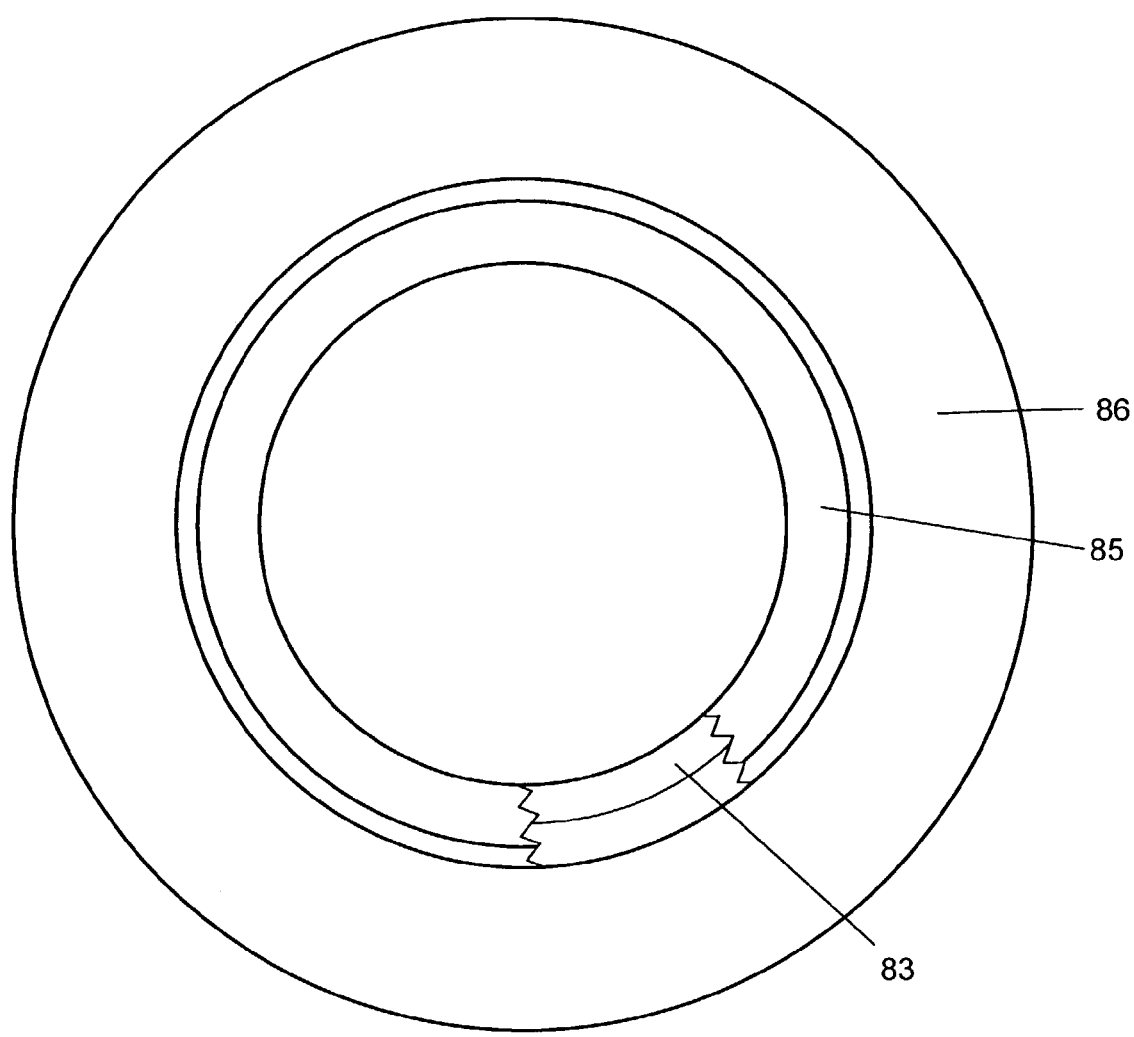
FIG. 26 is a bottom plain view, partially in section, of a nut-washer of the preferred embodiment.

FIG. 26, depicts yet another alternative embodiment of the present invention. As depicted therein, the bearing surface 84 is provided with a plurality of upper peaks of an undulation. The upper peaks are provided as plateau surfaces 118. The plateau surfaces 118 are generally spherically concave The plateau surfaces 118 are adjacent to a plurality of bearing faces 116. Each plateau segment 74 is adjacent to a pair of bearing faces 116. The bearing surface 84 of this alternative embodiment is provided with an annularly extending series of bearing faces 116, which form a uniform undulation around the entire surface. The bearing faces 116 are configured to correspond to faces 73 on the annular surface 72. As depicted in FIG. 26, the bearing faces 116 are generally spherically concave.

Each bearing face 73 is adjacent to a valley 122. Each valley 122 is adjacent to a pair of bearing faces 116. The valleys 122 are configured to be wider than valleys 75 on the annular surface 72.

As depicted in FIG. 26, the valleys 122 are generally spherically concave. The valleys 122 are formed in the forging process so that they are all concave and lie on the surface of an imaginary sphere whose center is on the axis of the washer body 82. The radius of that sphere ranges from 0.1 inches to 2.00 inches. As such, it will be seen that the plateau segments 74 on the nut body 52 are perfectly complementary in shape to the valleys 122 on the washer body 82.

The valley 122 and adjacent bearing faces 116 of the alternative embodiment provide an inverted Vee shape profile. The Vee shaped profile provides the plateau surfaces 118 with a height. The height equals the vertical distance between the plateau surface 118 and the valley 122. The height is preferably slightly greater than the clearance between the threads at 64 and those on a stud 10, when the nut-washer 99 is in place. In the alternative embodiment shown, the height is slightly less than approximately 0.015 inches (0.38 mm).

In the preferred embodiment, washer body 82 is provided with a clamping surface 86. As depicted in FIG. 13, the clamping surface 86 is provided on the outer end 88 of the washer body 82. In the presently preferred embodiment, the clamping surface 86 is generally flat.

In an alternative embodiment, the washer 54 is provided with an ear 108. The ear 108 is configured to cooperate with a stud 10. The ear 108 cooperates with a slot 49 provided on at least a portion of the stud 10. The ear 108 is of a size and shape suitable to slide loosely in an axially elongated slot 49 formed on one side of the threaded end section of a stud 10. The ear 108 preferably cooperates with the slot 49 to prevent the washer 54 from rotating with respect to the stud 10.

Figure 22:
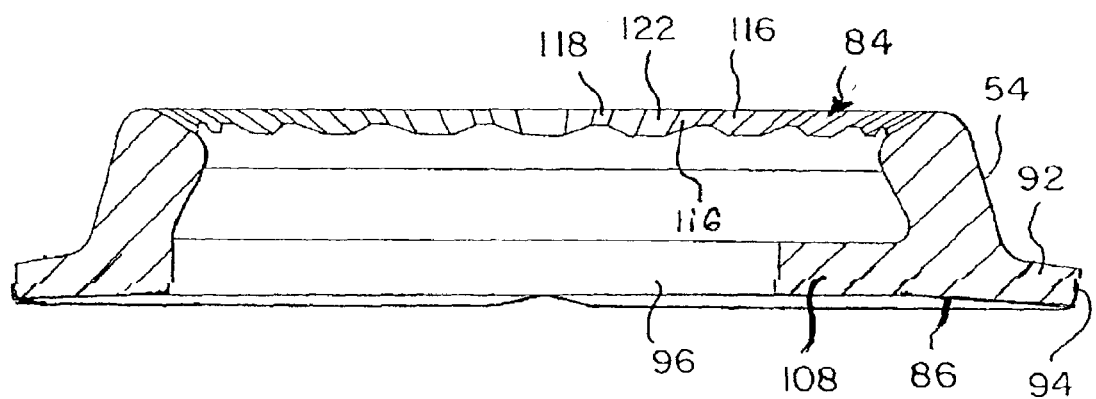
FIG. 22 is a side sectional view through the washer of an alternative embodiment, showing the concave curvature of its inclined bearing faces.
Figure 23:
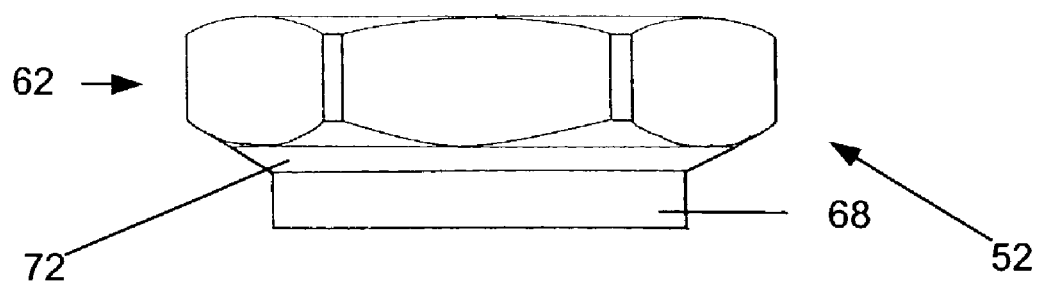
FIG. 23 is a side elevational view of a nut of the preferred embodiment.
Figure 24:
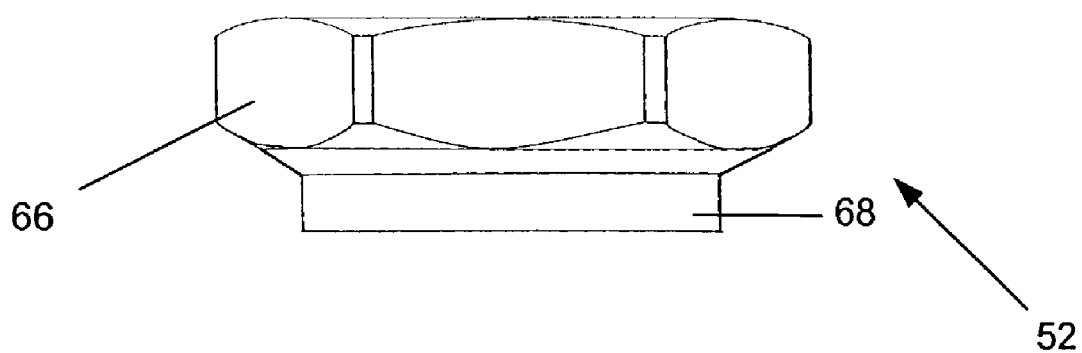
FIG. 24 is a side elevational view of a nut of the preferred embodiment.
Figure 25:
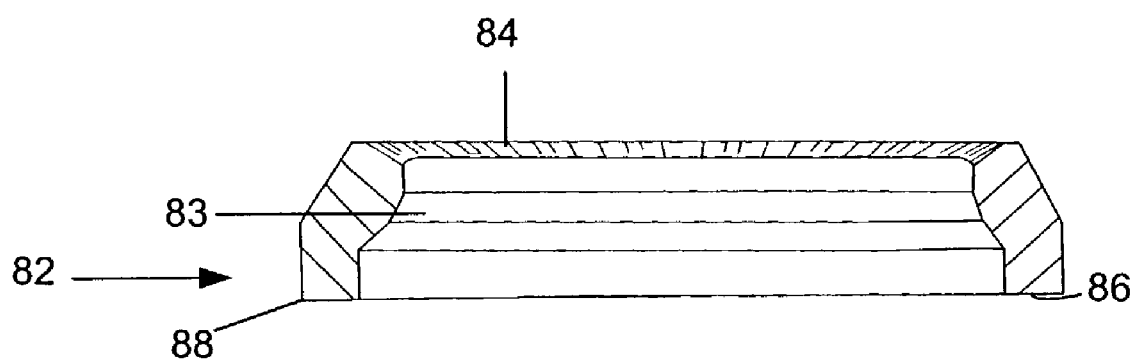
FIG. 25 is a side elevational view, in section, of a washer of the preferred embodiment.
Figure 29:
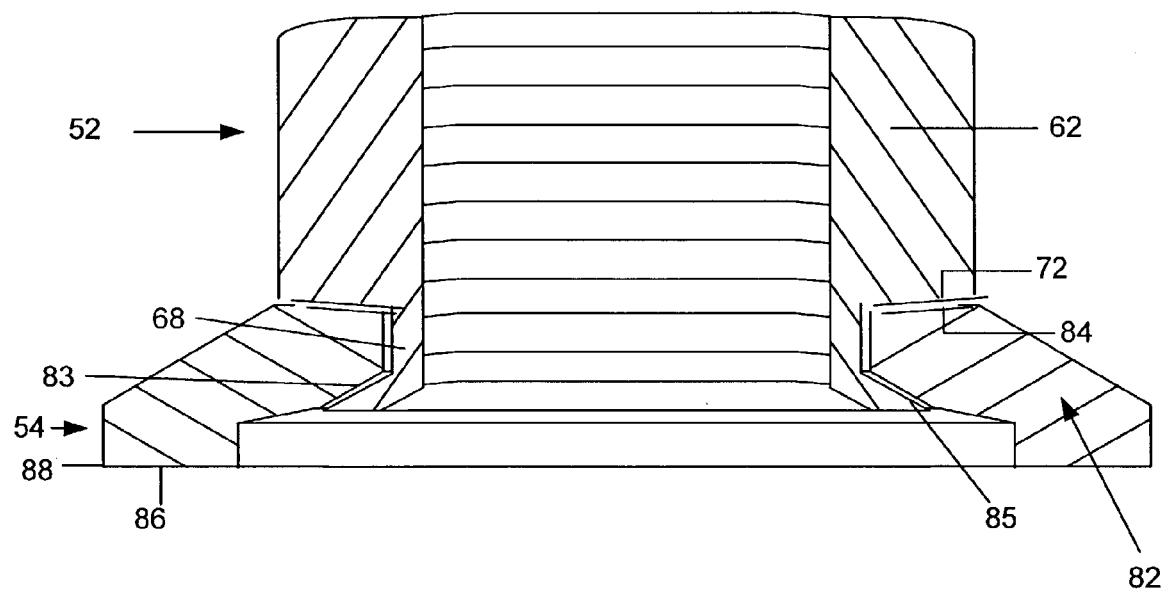
FIG. 29 is a side elevational view, in section, of a nut-washer of the preferred embodiment.
Figure 30:
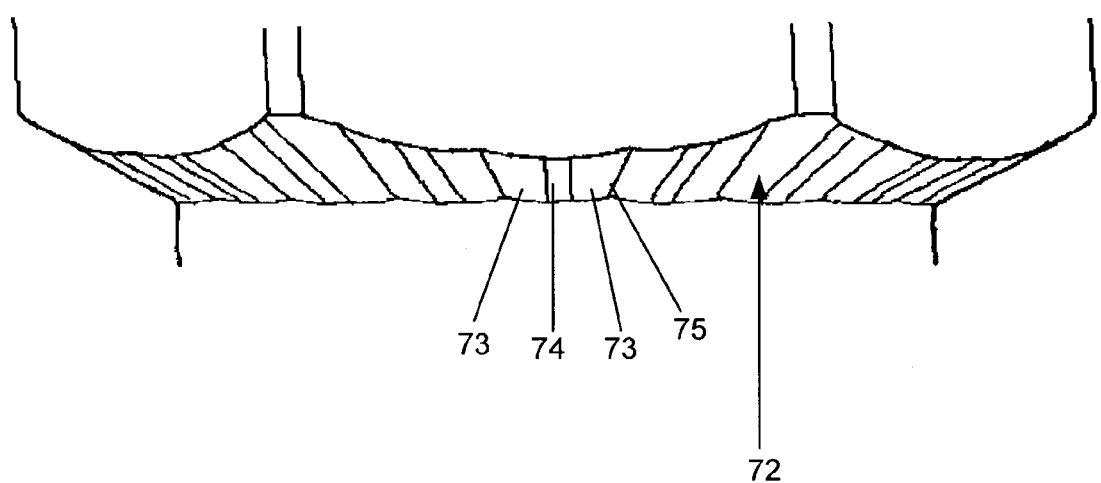
FIG. 30 is a close up side elevational view of an annular surface on a nut of an alternative embodiment.
Figure 31:
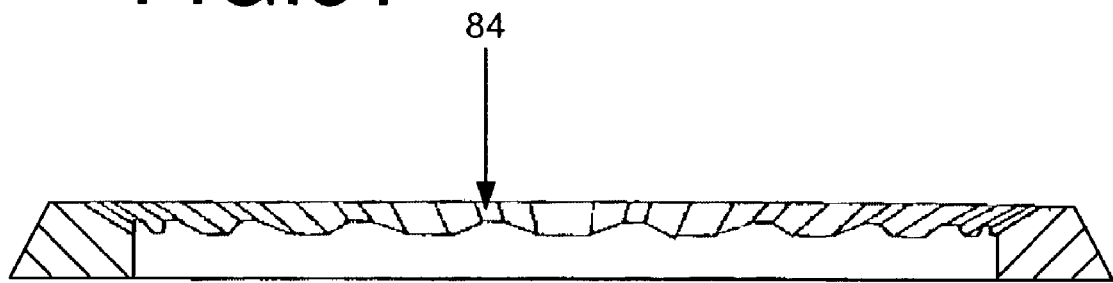
FIG. 31 is a side elevational view, in section, of a bearing surface on a washer of an alternative embodiment.
Figure 32:
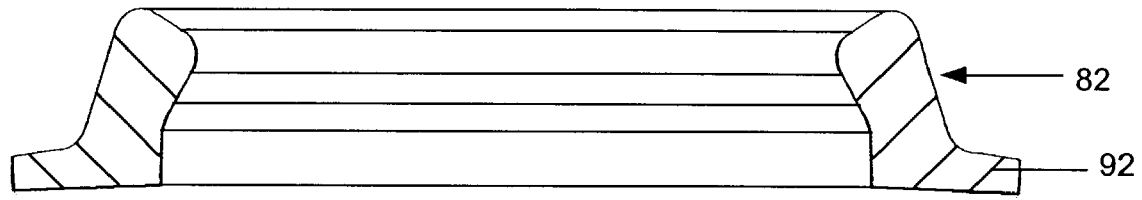
FIG. 32 is a side elevational view, in section, of a washer of an alternative embodiment.
Figure 33:
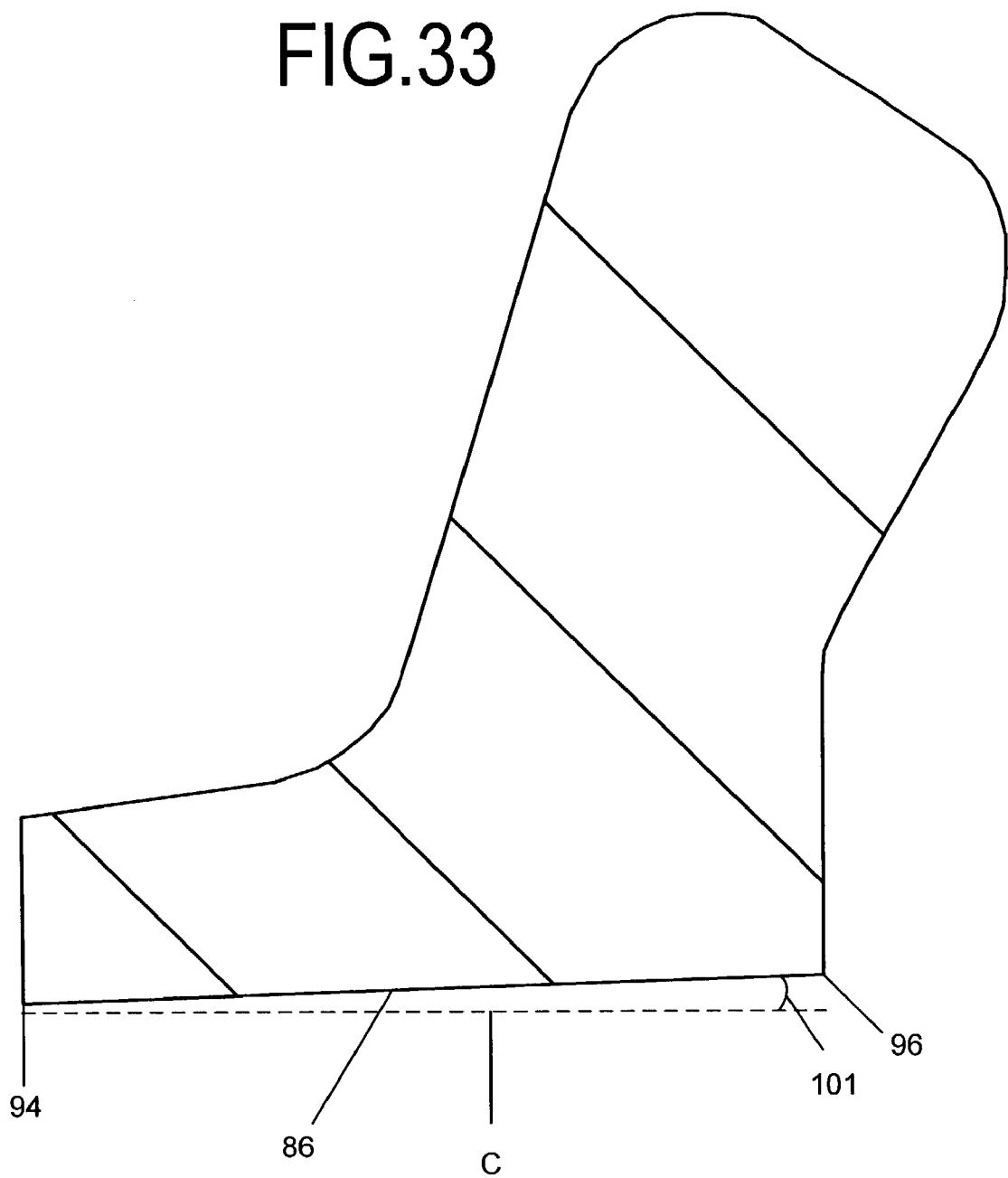
FIG. 33 is a close up side elevational view, in section, of a clamping surface on a washer of an alternative embodiment.
Figure 34:
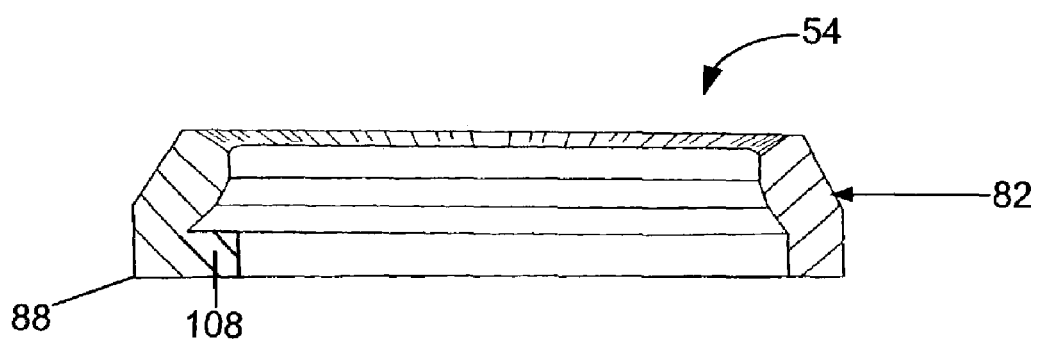
FIG. 34 is a side elevational view, in section, of a washer of an alternative embodiment.
Figure 35:
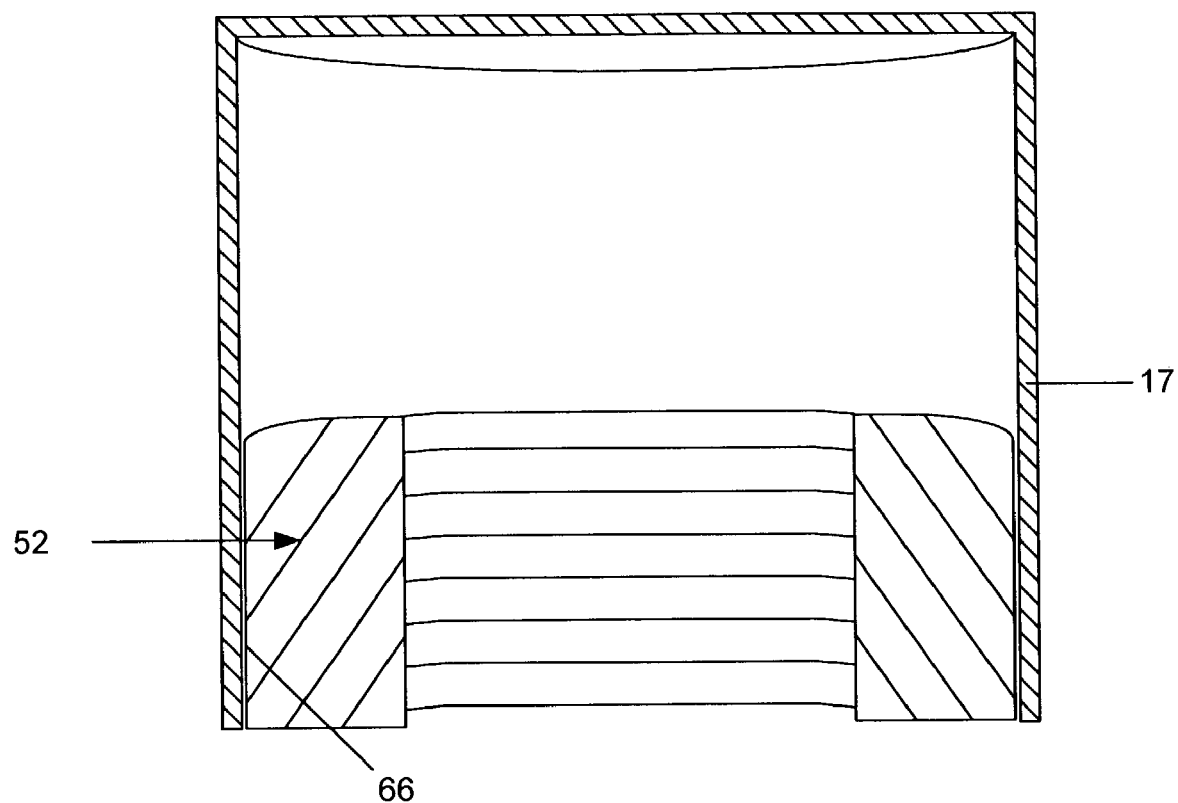
FIG. 35 is a side elevational view, in section, of a nut of the preferred embodiment in relation to a socket from a socket wrench.
Figure 36:
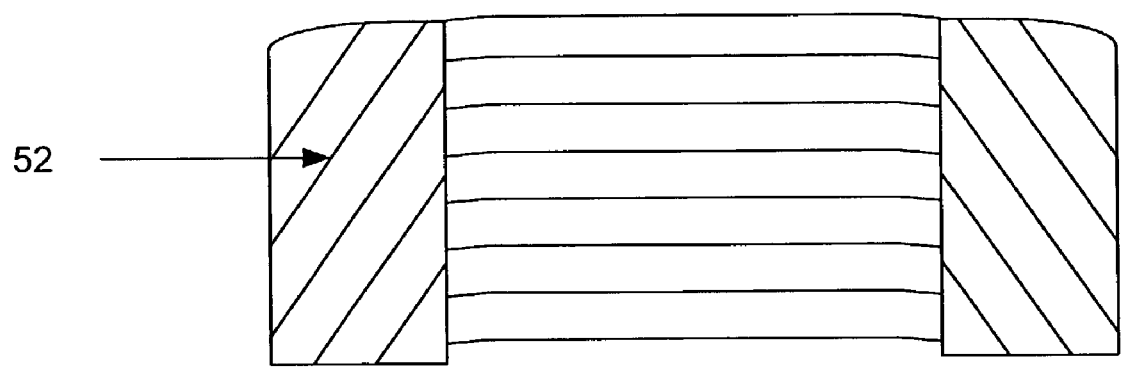
FIG. 36 is a side elevational view, in section, of a nut of the preferred embodiment.
Figure 37:
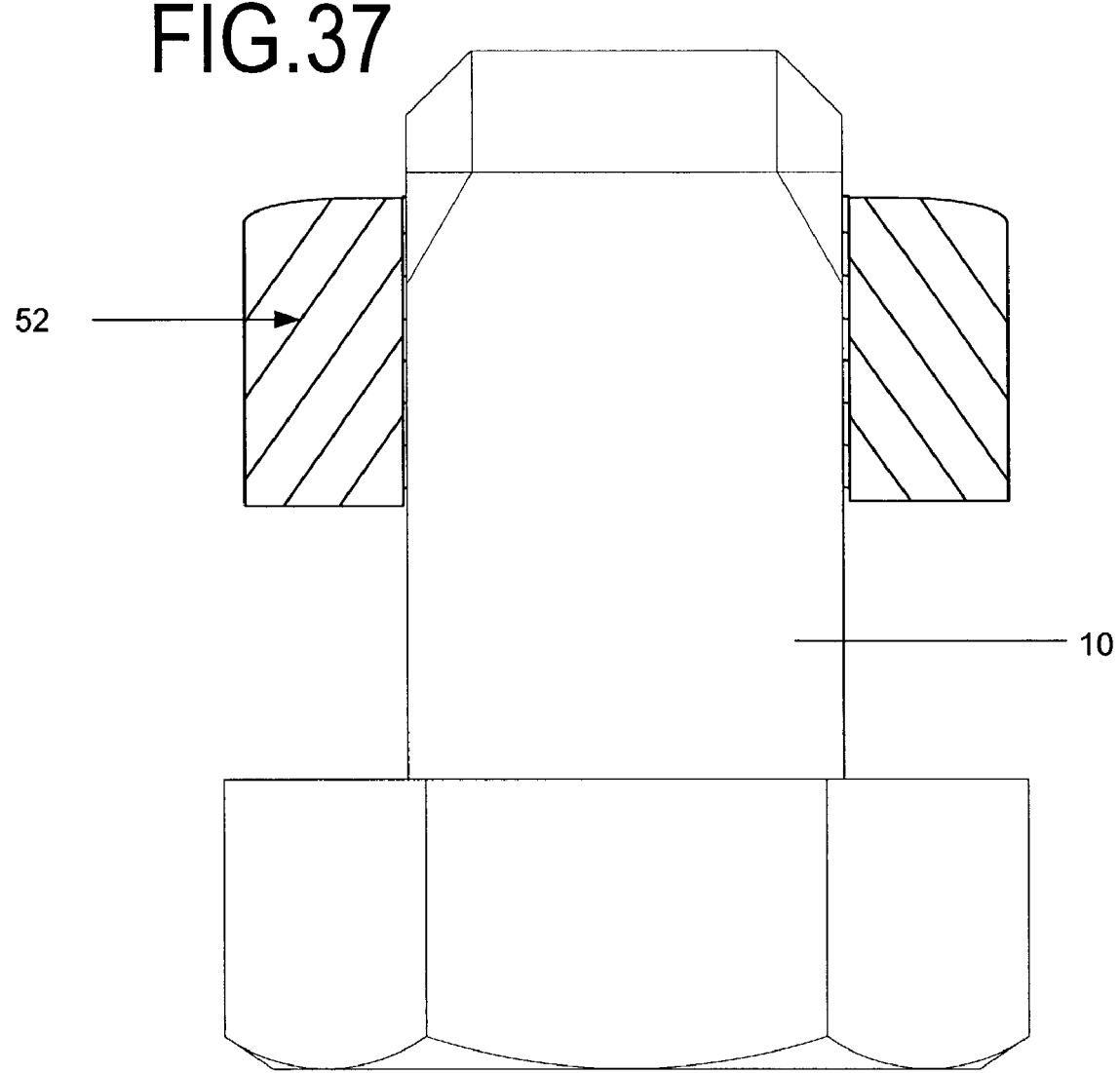
FIG. 37 is a side elevational view, in section, of a nut of the preferred embodiment in relation to a stud.

FIG. 22 depicts an ear 108 extending inward from end face 88 washer body 82. FIG. 22 depicts the ear 108 extending inwardly of the base of the washer body 82, opposite a flange 92. Referring now to FIG. 29, the ear 108 is depicted cooperating with a slot 49 on a portion of a stud 10.

Those skilled in the art will appreciate that the invention contemplates the use of other conventional means for preventing washer rotation. In the alternative, a flat may be formed on the stud 10 and a corresponding flat formed inwardly of the washer body 82.

FIG. 29 depicts yet another alternative embodiment of the present invention. As shown therein, the washer 54 is provided with a flange 92. The flange 92 extends outward from the washer body 82. In this alternative embodiment, the flange 92 is between 0.05 inches and 0.12 inches thick.

In another alternative embodiment the flange 92 is provided with a plurality of slots formed inwardly from its outer edge, at regular intervals around the flange 92. The slots permit intervening flange sections 102 to resiliently flex, albeit only slightly, when the clamping surface 86 is forced against a surface and is under the desired load.

FIG. 17 depicts the flange 92 provided with slots in the form of a plurality of cut-outs 98. The cut-outs 98 provide the flange 92 with a plurality of flange sections 102. Advantageously, the flange sections 102 are configured to flex axially. The flange sections 102 are configured to flex an axial distance which is slightly greater than the clearance between the threads on the stud and the threads on the nut 52.

In the alternative embodiment depicted in FIG. 5, the cut-outs 98 are generally U shaped. However those skilled in the art will appreciate that this invention contemplates utilizing cut-outs 98 with alternative shapes.

In the alternative embodiment depicted in FIG. 5, the flange 92 is provided with six cut-outs 98 yielding six flange sections. However those skilled in the art will appreciate that any number of cut-outs 98 may be employed. In particular, those skilled in the art will appreciate that it is advantageous to utilize more or less than six cut-outs 98, depending on the size and thickness of the flange 92.

Figure 27:
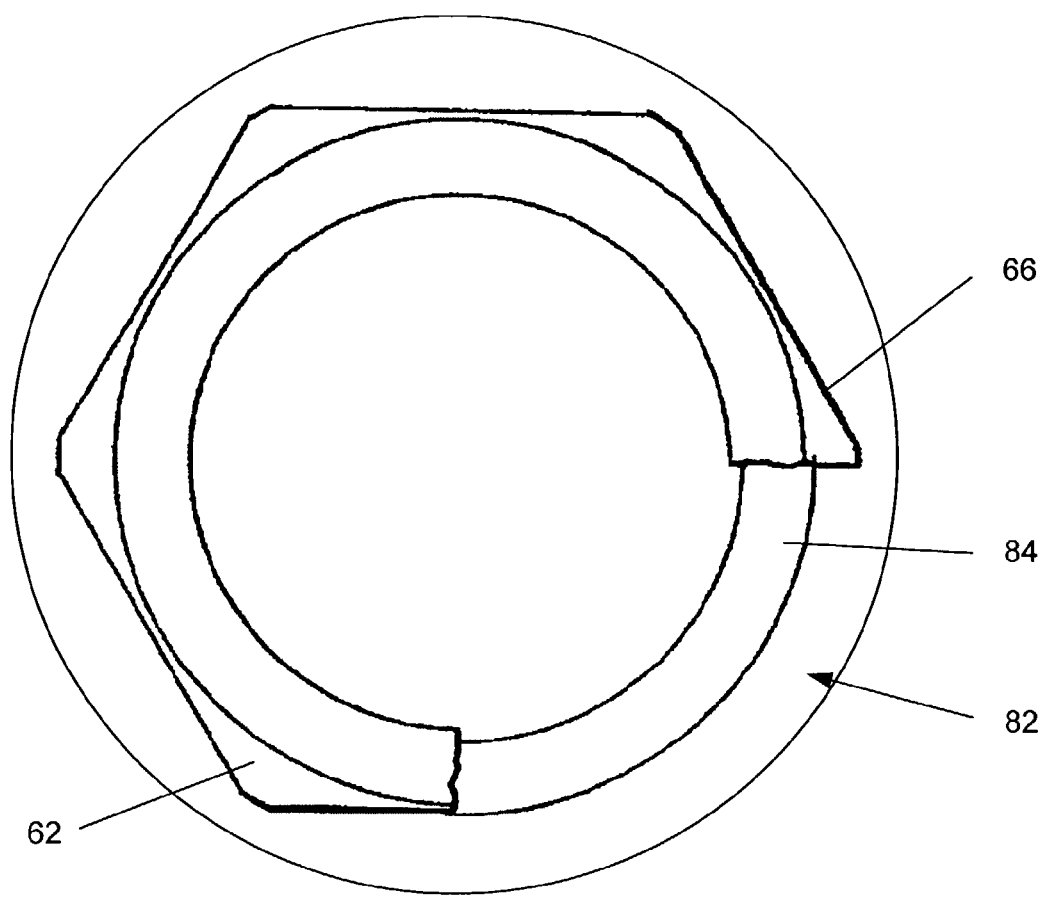
FIG. 27 is a top plain view, partially in section, of a nut-washer of the preferred embodiment.

In yet another alternative embodiment of the present invention, the washer 54 is provided with a clamping surface 86. Referring to FIG. 27, at least a portion of the clamping surface 86 is located on the flange 92. As shown therein, the clamping surface 86 is located on the bottom of the flange 92 and the outer face 88 of the washer body 82.

Figure 21:
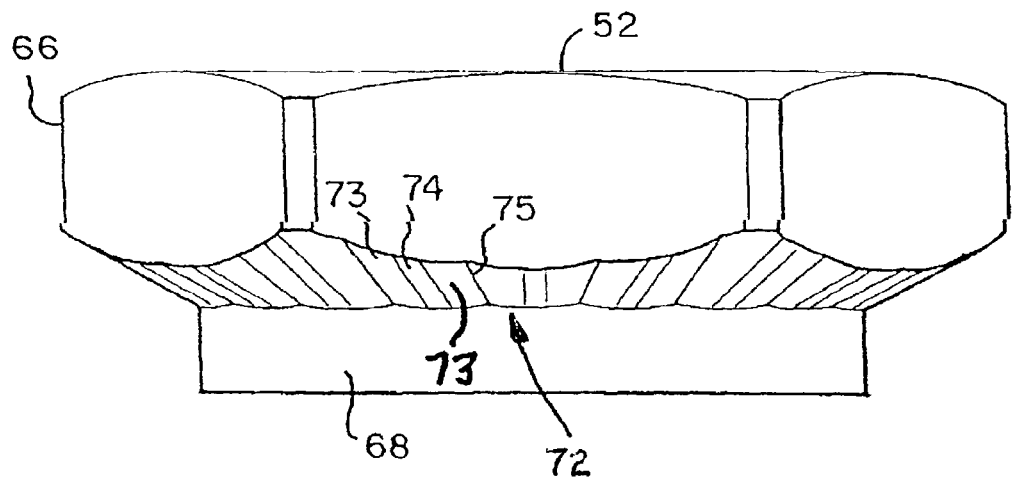
FIG. 21 is a side elevational view of a nut of an alternative embodiment, showing the convex curvature of its inclined bearing faces.

In this alternative embodiment, the slightly concave clamping surface 86 on the bottom of the washer 54 forms what approximates a shallow frustum of a cone. The clamping surface 86 is preferably inclined upwardly from the outer periphery 94 of the bottom of the washer flange 92 toward the inner periphery 96 of the body 82. As best depicted in FIG. 21, the clamping surface 86 is at an angle 101 with respect to imaginary line C. Angle 101 ranges from 0° to 3°. In this alternative embodiment, the angle 101 is 2°.

In another alternative embodiment, the washer 54 is provided with a plurality of depressions 104. Advantageously, the plurality of depressions 104 provide the clamping surface 86 with clamp segments 106. Advantageously, the clamp segments 106 are configured to flex axially.

Referring to FIG. 4, the depressions 104 are located on the bottom of the flange 92 and the outer face 88 of the washer body 82. In this alternative embodiment, the depressions 104 extend radially inward from corresponding cut-outs 98. As depicted in FIG. 4, the clamping surface 86 is provided with six depressions 104 that are generally Vee-shaped. However, those skilled in the art will appreciate that any number of depressions may be employed.

In the alternative embodiment depicted in FIG. 4, the depressions 104 effectively separate the annular clamp surface 86 into six clamp segments 106 that are provided with an arcuate shape. The arcuate outer extremities of the clamp segments 106 are located between the cut-outs 98 and are able to resiliently flex axially of the washer 54.

Figure 38:
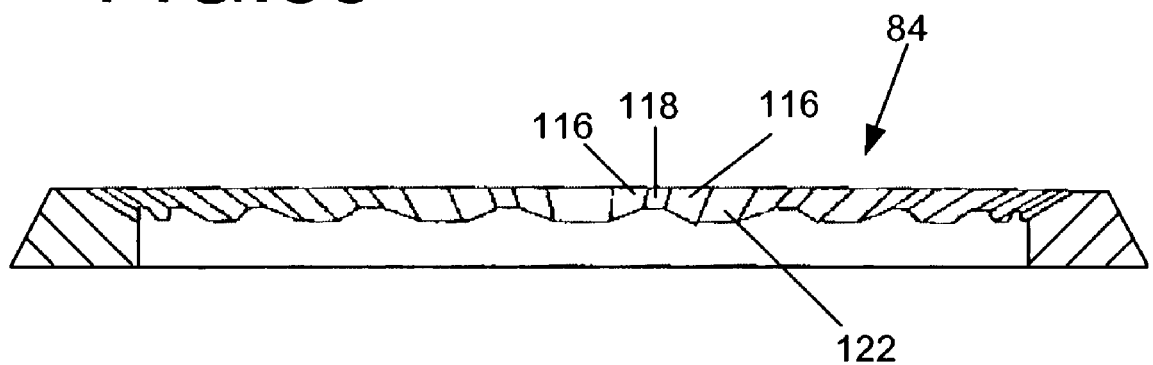
FIG. 38 is a side elevational view, in section, of a bearing surface on a washer of an alternative embodiment.
Figure 39:
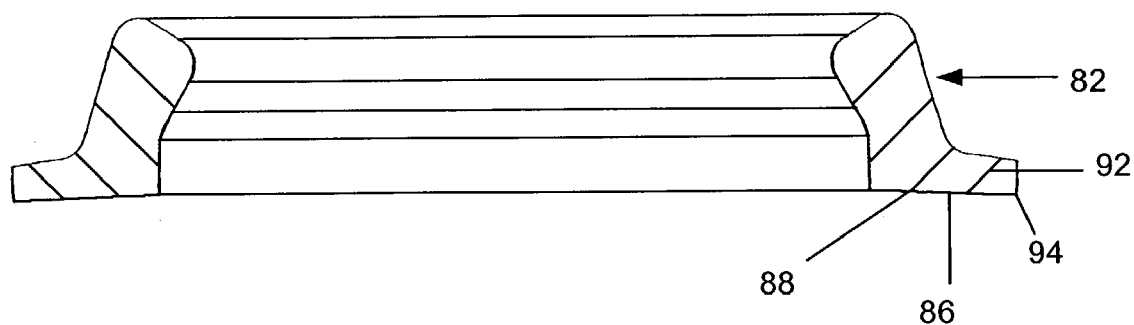
FIG. 39 is a side elevational view, in section, of a washer of an alternative embodiment.
Figure 40:
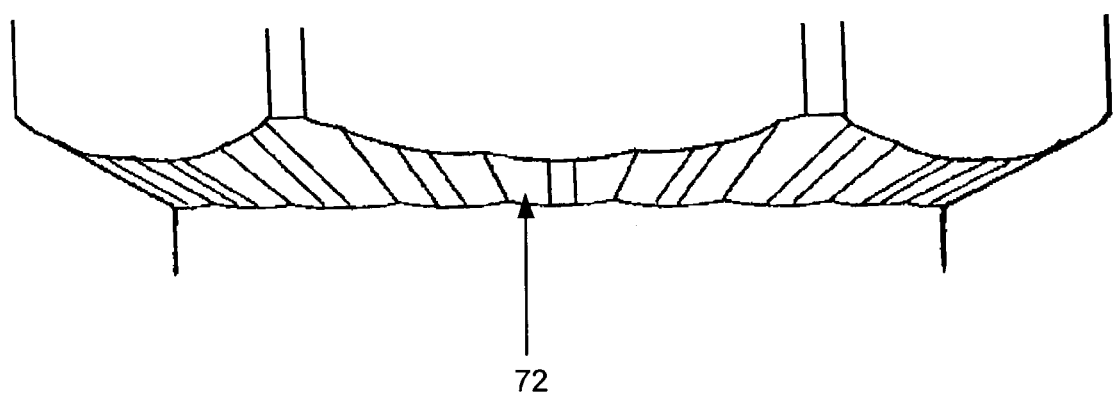
FIG. 40 is a close up side elevational view of the annular surface on the nut of an alternative embodiment.
Figure 41:
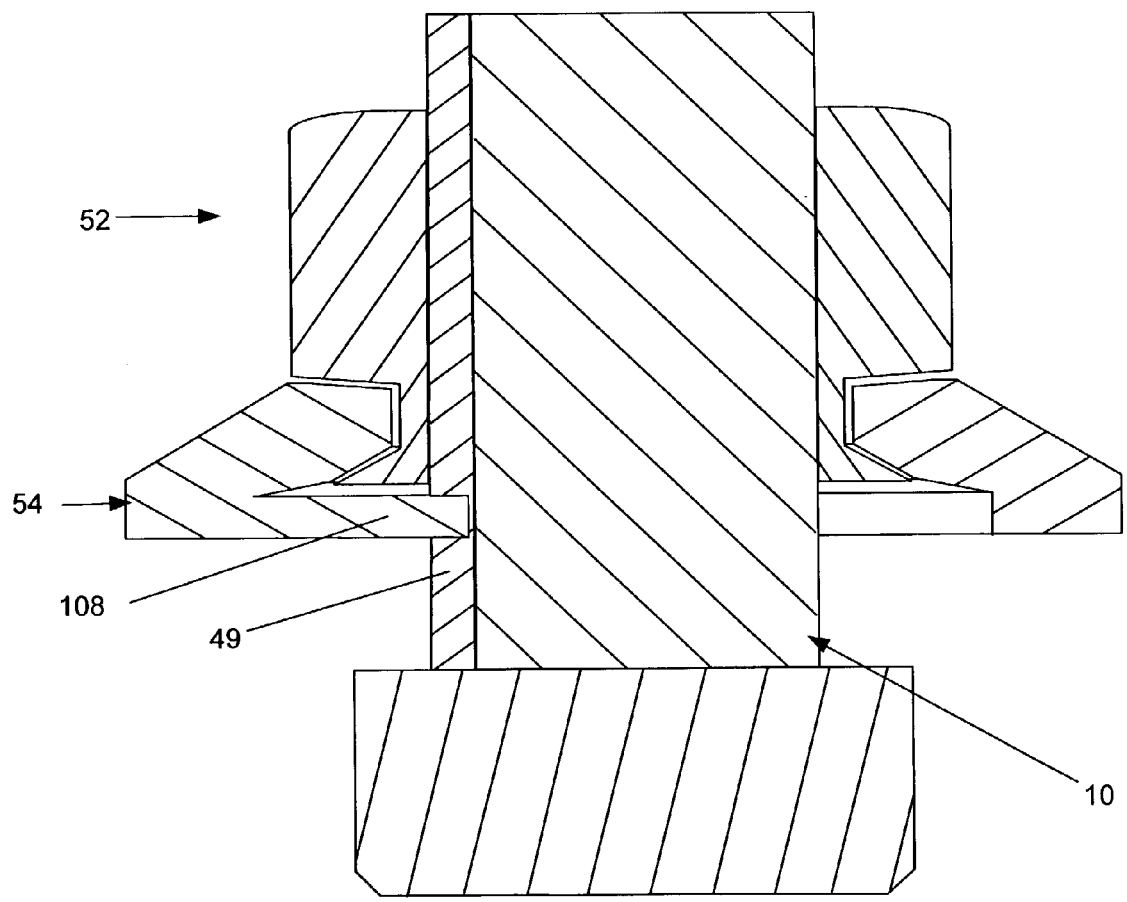
FIG. 41 is a side elevational view, in section, of the nut-washer of an alternative embodiment in relation to a stud having a notch.
Figure 42:
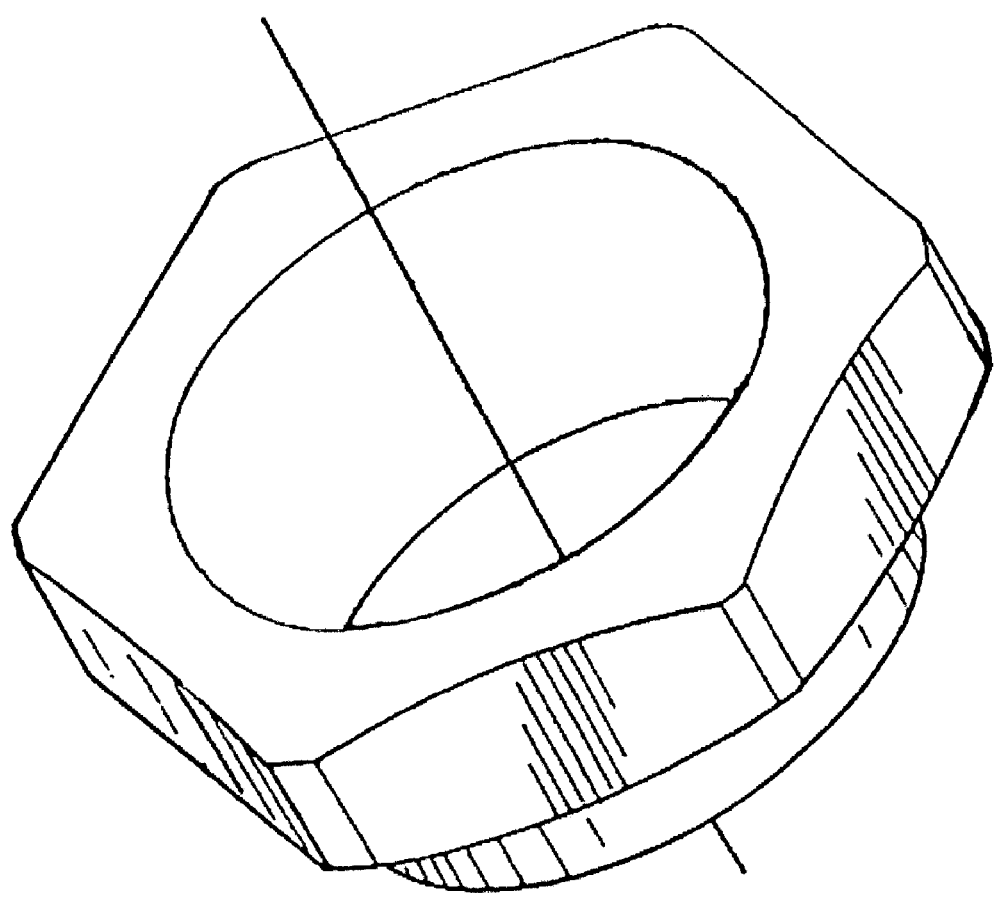
FIG. 42 is an exploded perspective view of a partially finished nut of the presently preferred embodiment.
Figure 43:
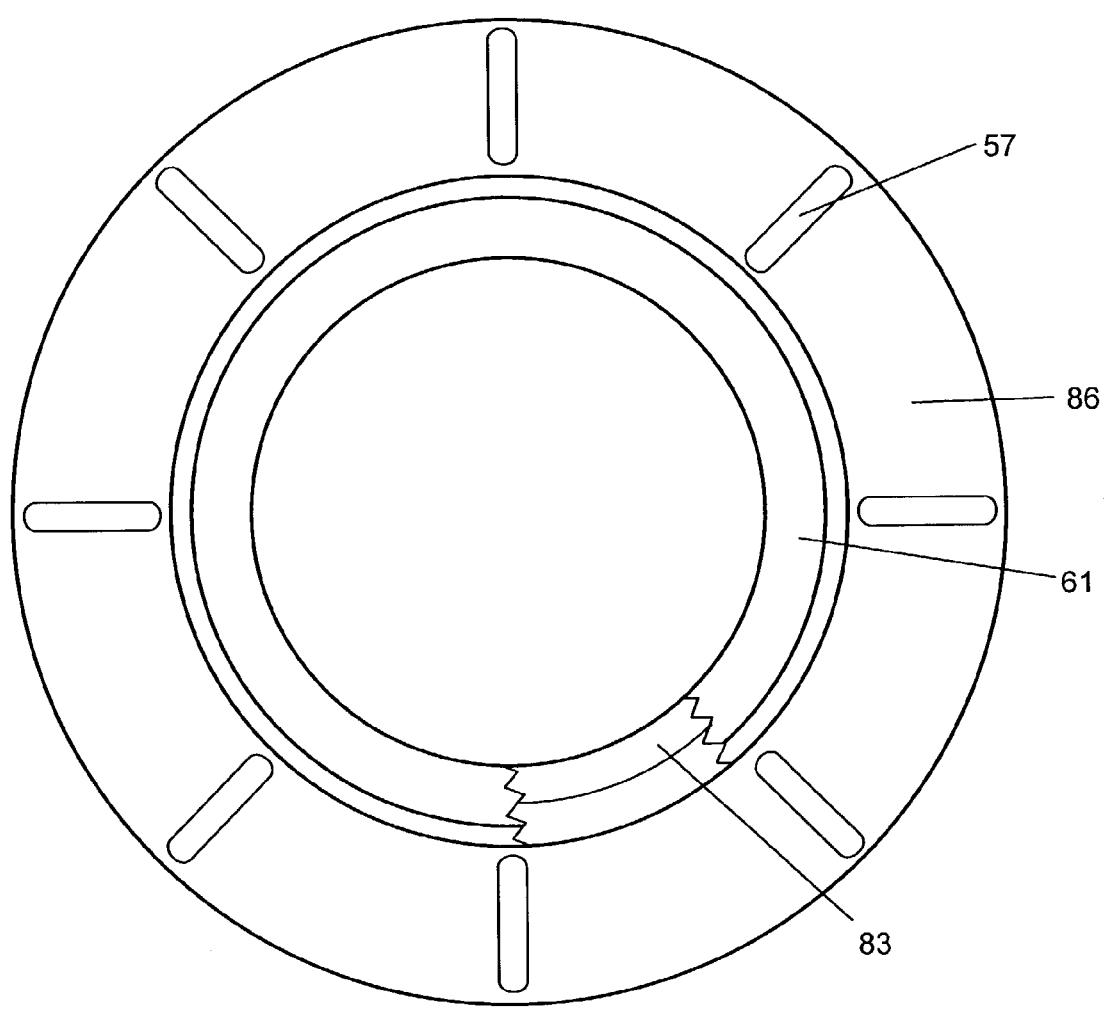
FIG. 43 is a bottom plain view, partially in section, of a nut-washer of an alternative embodiment.

FIG. 38 depicts the clamping surface 86 of an alternative embodiment. As shown therein the clamping surface 86 is provided with a plurality of protrusions 57. The protrusions 57 provide the clamping surface 86 with a higher frictional coefficient.

The protrusions 57 are configured to cooperate with a surface on which the clamping surface 86 is fastened. Advantageously, the protrusions 57 cooperate with the surface to prevent the washer 54 from rotating with respect to the surface that is being fastened. FIG. 38 depicts a clamping surface 86 that is provided with eight (8) protrusions; however, a clamping surface 86 may be provided with more than eight (8) protrusions, such as twelve (12) protrusions. Alternatively, the nut body 52 may be provided with a clamping surface 86 having protrusions 57 rather than the washer 54 as depicted in FIG. 38.

FIG. 17 depicts the nut 52 and washer 54 assembled in the preferred embodiment. As depicted therein, the nut 52 and washer 54 are preferably assembled by inserting the skirt 68 into the washer 54, whereby the annular surface 72 is opposed to the bearing surface 84. Thereafter, at least a portion of the skirt 68 is forced outward to provide a flared portion 85. The flared portion 85 is configured to underlie a portion of the washer 54, whereby it loosely but securely connects the nut 52 and washer 54, while permitting the nut 52 to rotate freely relative to the washer 54.

FIG. 14 depicts the preferred embodiment, wherein the flared portion 85 underlies an annular inward projection 83 around its circumference. However, those skilled in the art will appreciate that the skirt can be forced outward at spaced locations, which underlie a portion of the projection 83.

While this invention has been particularly shown and described with references to preferred embodiments thereof, it will be understood by those skilled in the art that various changes in form and details may be made therein without departing from the spirit and scope of the invention as defined by the appended claims.

Figure 44:
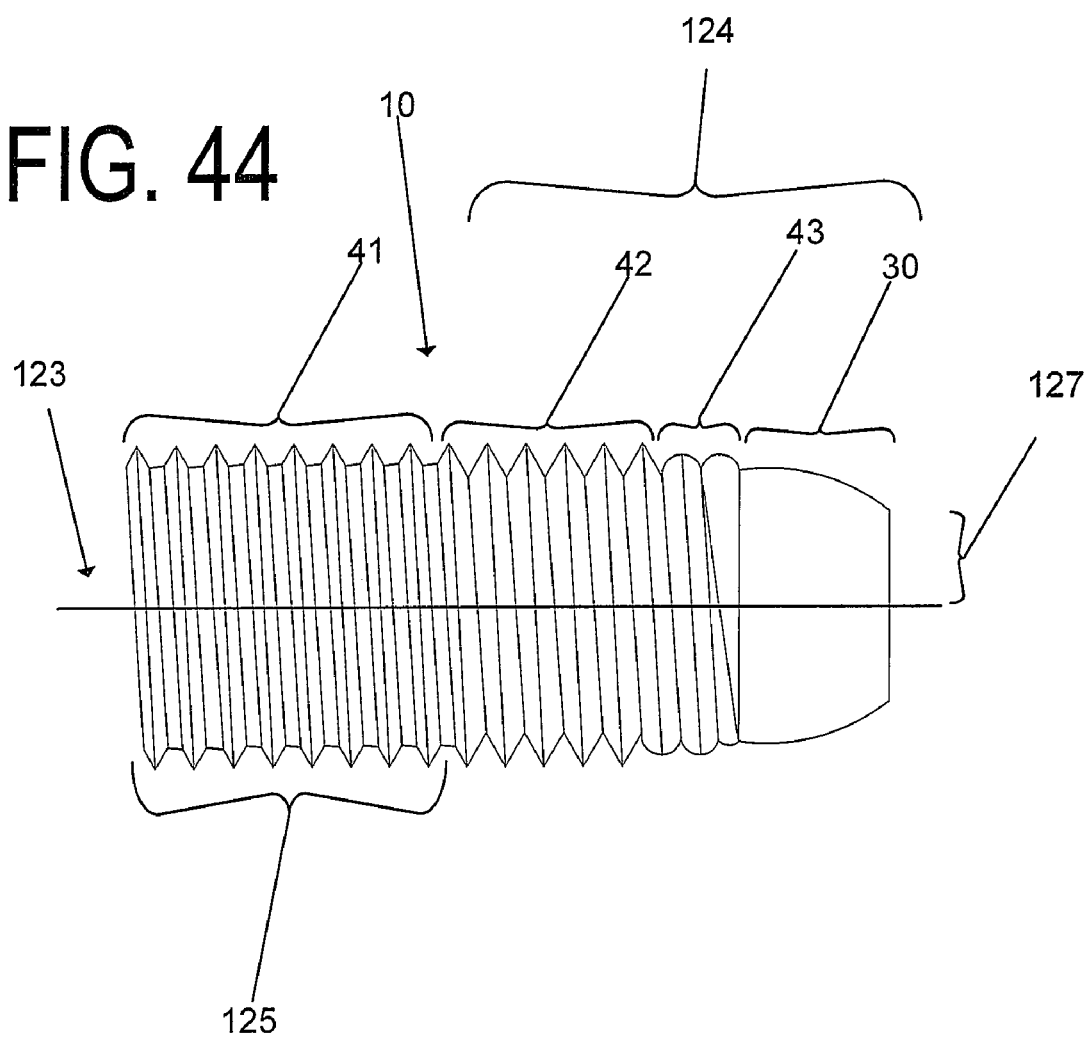
FIG. 44 depicts a close up view of the threaded surface on the stud.

Referring now to FIG. 44, the shaft 10 is provided with an axis 123, a first shaft element 124, and a second shaft element 125. The first shaft element 124 includes a first outer surface 126 and a radius 127. The radius 127 extends from the axis 123 of the shaft 10 to the first outer surface 126. The second shaft element 128 is provided with a locking thread 41 that includes a root surface 45. The distance between the axis 123 and the root surface 45 of the second shaft element 128 is greater than the radius 127 of the first shaft element 124.

What is claimed is:

1. A stud, comprising:
  a) a shaft that is fabricated from an alloy that includes nickel and provided with a trilobular shape;
  b) the shaft includes an axis, a first end, and a second end and is further provided with a threaded surface that includes a guide thread, a locking thread, and a conventional thread;
  c) the guide thread includes a guide means for guiding the threads on the shaft into mating alignment with a female thread of a female threaded member;
  d) the guide thread is generally located at the first end of the shaft and leads directly into the conventional thread;
  e) the conventional thread is provided with a generally Vee-shaped root provided with a first root diameter configured to mate with the female threads of the female threaded member so as to be capable of relative rotation;
  f) the conventional thread extends for a plurality of turns and is provided with a generally uniform shape;
  g) the conventional thread leads directly into the locking thread; and
  h) the locking thread includes a root surface provided with a second root diameter that is greater than the first root diameter, wherein the locking thread is configured to re-form the female threads to resist relative rotation between the shaft and the female threaded member.

2. The stud according to claim 1, wherein the root surface is at an angle between four and eight degrees relative to the axis of the shaft.

3. The stud according to claim 1, wherein:
  a) the root surface is at an angle relative to the axis of the shaft; and
  b) the guide means includes a curved surface located between a first side and a second side.

4. The stud according to claim 1, wherein:
  a) the guide means includes a curved surface located between a first side that is curved and a second side that is curved; and
  b) the shaft includes a stainless steel.

5. The stud according to claim 1, wherein:
  a) the guide thread is a plateau thread; and
  b) the root surface is at an angle relative to the axis of the shaft.

6. A stud that includes an axis, comprising:
  a) a shaft that is fabricated from a martensitic stainless steel and is generally trilobular in shape;
  b) the shaft is provided with a threaded surface that includes a locking thread, a guide thread, and a conventional thread;
  c) the guide thread includes a guide means for guiding the threads on the shaft into mating alignment with a female thread of a female threaded member;
  d) the guide thread is generally located at an end of the shaft and leads directly into the conventional thread;
  e) the conventional thread is provided with a generally Vee-shaped root configured to mate with the female threads of the female threaded member so as to be capable of relative rotation;
  f) the generally Vee-shaped root includes a first root diameter;
  g) the conventional thread extends for a plurality of turns and leads directly into the locking thread; and
  h) the locking thread includes a root surface provided with a second root diameter that is greater than the first root diameter, wherein the locking thread is configured to re-form the female threads to resist relative rotation between the shaft and the female threaded member.

7. The stud according to claim 6, wherein the root surface is at an angle between four and eight degrees relative to the axis of the shaft.

8. The stud according to claim 6, wherein:
  a) the root surface is at an angle relative to the axis of the shaft; and
  b) the guide means includes a curved surface located between a first side and a second side.

9. The stud according to claim 6, wherein:
a) the guide means includes a curved surface located between a first side that is curved and a second side that is curved; and
b) the shaft includes a 410 grade stainless steel.

10. The stud according to claim 6, wherein:
a) the guide thread is a plateau thread; and
b) the root surface is at an angle relative to the axis of the shaft.

11. A stud, comprising:
a) a shaft fabricated from an A286 grade stainless steel;
b) the shaft is provided with a trilobular shape and an axis;
c) the shaft includes a guide thread that is provided with a guide means for guiding the threads on the shaft into mating alignment with a female thread of a female threaded member so that the female threaded member can be torqued onto the guide thread of the shaft;
d) the guide thread is generally located at an end of the shaft and leads directly into a conventional thread;
e) the conventional thread is provided with a generally Vee-shaped root, the generally Vee-shaped root is provided with a first root diameter configured to mate with the female threads of the female threaded member so as to be capable of relative rotation;
f) the conventional thread has a generally uniform shape which extends for a plurality of turns;
g) the conventional thread leads directly into a locking thread, which is provided with a root surface configured to re-form the female threads to resist relative rotation between the shaft and the female threaded member; and
h) the root surface of the locking thread is provided with a second root diameter that is greater than the first root diameter of the conventional thread.

12. The stud according to claim 11, wherein the root surface is at an angle between four and eight degrees relative to the axis of the shaft.

13. The stud according to claim 11, wherein:
a) the root surface is at an angle relative to the axis of the shaft; and
b) the guide means includes a curved surface located between a first side and a second side.

14. The stud according to claim 11, wherein the guide means includes a curved surface located between a first side that is curved and a second side that is curved.

15. The stud according to claim 11, wherein:
a) the guide thread is a plateau thread; and
b) the root surface is at an angle relative to the axis of the shaft.

16. A stud, comprising:
a) a shaft fabricated from a medium carbon steel;
b) the shaft is provided with a triobular shape and an axis;
c) the shaft includes a guide thread that is provided with a guide means for guiding the threads on the shaft into mating alignment with a female thread of a female threaded member so that the female threaded member can be torqued onto the guide thread of the shaft;
d) the guide thread is generally located at an end of the shaft and leads directly into a conventional thread;
e) the conventional thread is provided with a generally Vee-shaped root, the generally Vee-shaped root is provided with a first root diameter configured to mate with the female threads of the female threaded member so as to be capable of relative rotation;
f) the conventional thread has a generally uniform shape which extends for a plurality of turns;
g) the conventional thread leads directly into a locking thread, which is provided with a root surface configured to re-form the female threads to resist relative rotation between the shaft and the female threaded member; and
h) the root surface of the locking thread is provided with a second root diameter that is greater than the first root diameter of the conventional thread.

17. The stud according to claim 16, wherein the root surface is at an angle between four and eight degrees relative to the axis of the shaft.

18. The stud according to claim 16, wherein:
a) the root surface is at an angle relative to the axis of the shaft; and
b) the guide means includes a curved surface located between a first side and a second side.

19. The stud according to claim 16, wherein the guide means includes a curved surface located between a first side that is curved and a second side that is curved.

20. The stud according to claim 16, wherein:
a) the guide thread is a plateau thread; and
b) the root surface is at an angle relative to the axis of the shaft.

21. A stud, comprising:
a) a shaft fabricated from a super alloy that includes a high nickel material;
b) the shaft is provided with a triobular shape and an axis;
c) the shaft includes a guide thread that is provided with a guide means for guiding the threads on the shaft into mating alignment with a female thread of a female threaded member so that the female threaded member can be torqued onto the guide thread of the shaft;
d) the guide thread is generally located at an end of the shaft and leads directly into a conventional thread;
e) the conventional thread is provided with a generally Vee-shaped root, the generally Vee-shaped root is provided with a first root diameter configured to mate with the female threads of the female threaded member so as to be capable of relative rotation;
f) the conventional thread has a generally uniform shape which extends for a plurality of turns;
g) the conventional thread leads directly into a locking thread, which is provided with a root surface configured to re-form the female threads to resist relative rotation between the shaft and the female threaded member; and
h) the root surface of the locking thread is provided with a second root diameter that is greater than the first root diameter of the conventional thread.

22. The stud according to claim 21, wherein the root surface is at an angle between four and eight degrees relative to the axis of the shaft.

23. The stud according to claim 21, wherein:
a) the root surface is at an angle relative to the axis of the shaft; and
b) the guide means includes a curved surface located between a first side and a second side.

24. The stud according to claim 21, wherein the guide means includes a curved surface located between a first side that is curved and a second side that is curved.

25. The stud according to claim 21, wherein:
a) the guide thread is a plateau thread; and
b) the root surface is at an angle relative to the axis of the shaft.

* * * * *